US005712984A

United States Patent [19]
Hammond et al.

[11] Patent Number: 5,712,984
[45] Date of Patent: Jan. 27, 1998

[54] SYSTEM FOR FUNDING FUTURE WORKERS' COMPENSATION LOSSES

[75] Inventors: Mark S. Hammond, Laguna Niguel; Vincent J. Bianco, Long Beach; James W. Bonk, Fullerton, all of Calif.; Jack Zwanziger, Rochester, N.Y.

[73] Assignee: Risk Data Corporation, Irvine, Calif.

[21] Appl. No.: 59,506

[22] Filed: May 11, 1993

Related U.S. Application Data

[63] Continuation of Ser. No. 652,424, Feb. 6, 1991, abandoned.
[51] Int. Cl.$^6$ ..................................................... G06F 17/60
[52] U.S. Cl. ............................................. 395/204; 395/201
[58] Field of Search .................................. 364/401, 408; 395/204, 201; 283/54

[56] References Cited

U.S. PATENT DOCUMENTS

| | | | |
|---|---|---|---|
| 4,220,911 | 4/1980 | Matsumoto | 323/343 |
| 4,346,442 | 8/1982 | Musmanno | 395/236 |
| 4,642,768 | 2/1987 | Roberts | 395/204 |
| 4,700,295 | 10/1987 | Katsof et al. | 395/210 |
| 4,707,444 | 11/1987 | King, Jr. et al. | 435/26 |
| 4,722,055 | 1/1988 | Roberts | 395/236 |
| 4,787,036 | 11/1988 | Fleming | 395/210 |
| 4,804,051 | 2/1989 | Ho | 175/26 |
| 4,838,384 | 6/1989 | Thangapelu | 187/385 |
| 4,845,625 | 7/1989 | Gray et al. | 395/205 |

OTHER PUBLICATIONS

Williams, R., "Implementation of New Mini–Estimating System", Memorandum to Sondra O'Connor, Jul. 10, 1978.

Ronald E. Ferguson, "Trend Factors—A Model Approach," *CPCU Journal*, vol. 31, No. 3, Sep. 1978, pp. 163–166.

James D. Hogan, et al., "Constructing a Loan Loss Model For Consumer Loans," *Journal of Retail Banking*, vol. IX, No. 3, Fall 1987, pp. 64–70.

Ferguson, Ronald E., "Trend Factors—A Model Approach", CPCY JrnL, v 31, N 3, pp. 163–166, Sep. 1978, Abs. from In from File of Orbit.

Hurlimann, Werner, "Simple Risk Forecasts Using Credibility", Insurance: Mathematics & Economics, v 7 N 4, pp. 251–259, Dec. 1988, Abs from Inform File of Orbit An: 89–16736.

(List continued on next page.)

*Primary Examiner*—Gail O. Hayes
*Assistant Examiner*—Frantzy Poinvil
*Attorney, Agent, or Firm*—Knobbe, Martens, Olson & Bear LLP

[57] ABSTRACT

A system funds future losses incurred by an insurance carrier on active workers' compensation insurance claims. Statistical models are used to predict future costs and durations of claims. The statistical models are generated by applying statistical analysis techniques to representative historical insurance claim data with the aid of a professional statistician. Forecasting accuracy is improved by generating several models wherein each model represents a predefined type of insurance claim. Each model is applied to active claims of the corresponding type to obtain cost and duration predictions for those claims. A total cost prediction for a claim is proportioned among various cost categories to more accurately reflect actual and predicted claim costs. For each claim, a reserve amount is calculated which is the predicted cost minus the amount of money paid to date on the claim. Balancing of the respective reserve amounts computed for active claims is achieved by use of a hypothetical fund which transfers reserve money from overpredicted claims to the reserves of underpredicted claims. A total reserve amount is calculated for each claim, and an aggregate reserve amount is calculated for all the carrier's active claims. The aggregate reserve amount is used to set a loss reserve account maintained by the carrier to fund future losses incurred on those claims. A system computer and program generate the statistical models. A carrier-accessible computer houses the models for application to active claims. A carrier host computer stores and updates the active claims of the insurance carrier.

39 Claims, 12 Drawing Sheets

OTHER PUBLICATIONS

Hogan, James D., et al. "Constructing a Loan Loss Model for Consumer Loans," Jrnl of Retail Banker, v 9 N 3 pp. 64–70 Fall 1987, Abs Inform File of Orbit AN: 87–35485.

Nicholson, Walter, "A Statistical Model of Exhaust of Unamp Nene", Jrnl of Human Resources, v 16 N 1, pp. 117–128, Winter 1981, Ab Inform File of Orbit, AN: 81–09800.

FIG. 3     <u>OBTAIN CARRIER CLAIM DATA</u>

FIG. 4  STATISTICAL MODELS

FIG. 11

| | | | | |
|---|---|---|---|---|
| Claim Number > | | WC - 000999 | | |
| | | CLAIM SUMMARY | | |
| | | Amt. Paid ⁄455 | Reserve ⁄459 | Total ⁄463 Incurred |
| 467 - Medical | | 4,263 | 15,360 | 19,623 |
| 471 - Indemnity | | 0 | 36,118 | 36,118 |
| 475 - Voc Rehab | | 750 | 11,483 | 12,233 |
| 479 - Allocated | | 0 | 4,605 | 4,605 |
| Claim Total | | 5,013 | 67,566 | 72,579 |
| | | | ⬉483 | |
| OK to Continue? | | > | Expected Closure In> | 33 Months |

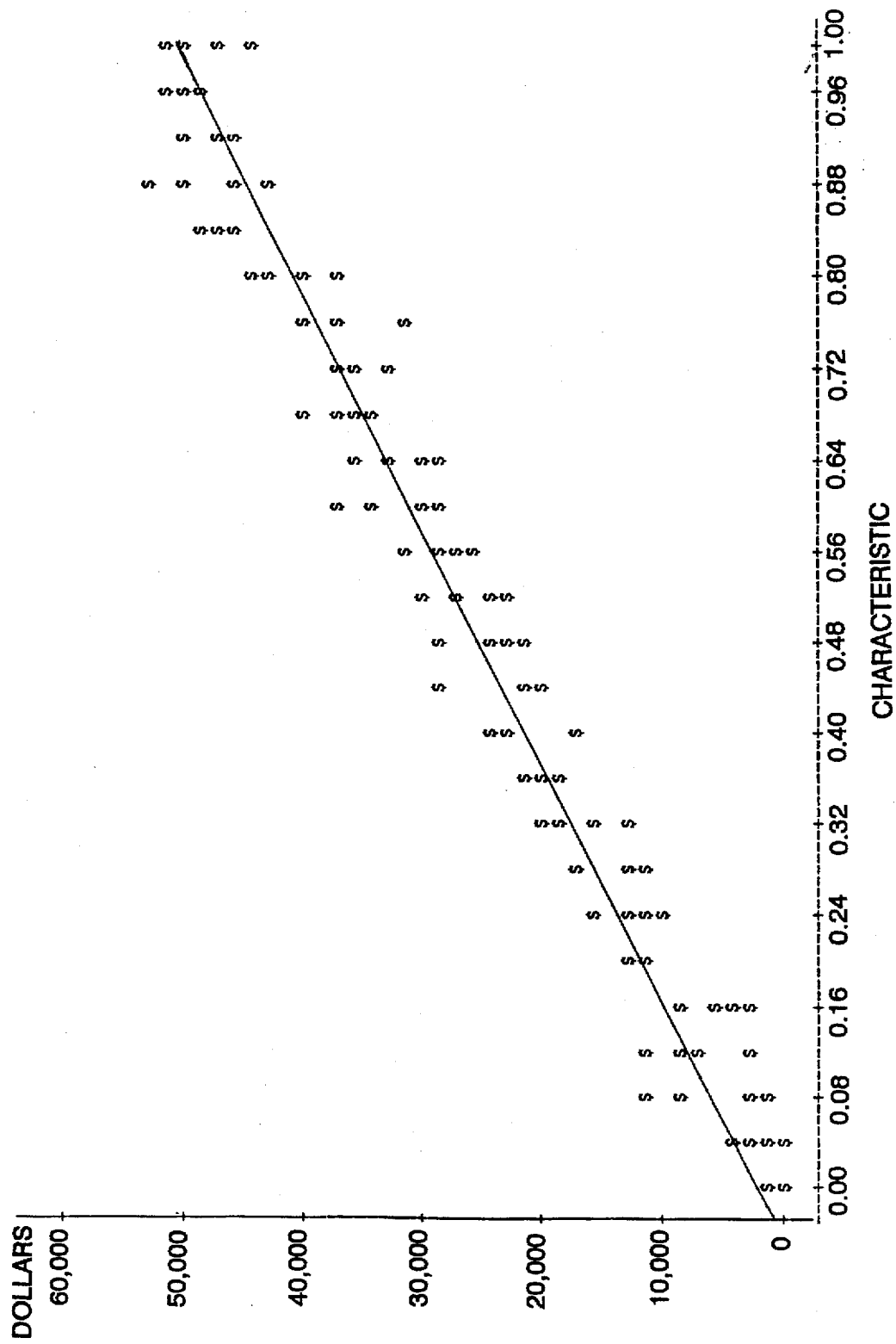

SYSTEM FOR FUNDING FUTURE WORKERS' COMPENSATION LOSSES

This application is a continuation of application Ser. No. 07/652,424, filed Feb. 6, 1991 abandoned.

FIELD OF THE INVENTION

The present invention relates to a system for accurately forecasting and funding future losses incurred by insurance carriers on workers' compensation claims.

BACKGROUND OF THE INVENTION

All states require by statute that workers' compensation insurance carriers maintain reserves to fund anticipated future losses to be incurred from workers' compensation claims. In California, for example, workers' compensation rules are set forth in Cal. Ins. Code §923.5, §11550, et seq. (West 1988) and Cal. Labor Code §1100, et seq., §3200, et seq. (West 1989). As a general matter, this area of the law is highly regulated by the government.

Because of the statutory requirements, and also because of purely economic reasons, such as maintaining solvency, it is desirable for workers' compensation insurance carriers to be able to maintain a loss reserve amount which corresponds as closely as possible to the actual ultimate liability from workers' compensation claims. Due to the inherent uncertainty in predicting or forecasting such prospective liabilities, reserve amounts maintained by carriers are very likely to substantially exceed or substantially underestimate the actual ultimate costs incurred on such workers' compensation claims. Such disparities between predicted losses and actual losses annually cost workers' compensation insurance carriers, overall, millions of dollars. For example, California's Insurance Rating Bureau has published statistics to the effect that California insurance carriers have been underreserving at an overall rate of 15% on maintained loss reserves over the period from 1985 to 1989. Computed on $677 million in policy holders' dividends paid out by California carriers in 1989, a 15% error rate for reserves equates to an approximately $101 million error. Also, underreserving results in artificially high dividend payments to employers, potential insolvency of the insurance carrier itself due to insufficient reserves to pay current obligations, a showing of artificially high company profits because of the failure to show true losses, and inaccurate computation of insurance premiums. Overestimation of loss reserves can cost an employer dividend dollars and will overinflate the employer's experience modification resulting in an artificial increase in premiums charged in subsequent years.

Difficulties in accurate future loss prediction may be the consequence of one or more of a number of factors. For example, manual methods have relied on the experience and judgment of individual claims adjustors or supervisors. The varied capabilities, performance and decision making powers of such individuals, as well as their inability to properly synthesize and analyze large quantities of available historical data and information, may result in inaccurate predictions. Also, periodic review of aggregate loss reserves by actuaries has proved to be an inadequate method of accurately forecasting workers' compensation liabilities.

Because of changing workers' compensation state benefit legislation, it has become increasingly important to accurately set loss reserves on a per-claim basis since state benefits apply on an individual claim basis rather than aggregately. Further, loss reserves have come under more thorough scrutiny by employers, brokers, rating bureaus, regulatory agencies, consultants, and consumer groups. Because existing methods for setting loss reserves are often inaccurate, and thus inadequate, it has become increasingly difficult, expensive and time-consuming for insurance carriers to defend their loss reserves to these organizations.

For the foregoing reasons, it is desirable to have a standardized method for determining loss reserves which would allow both insurers and employers to budget and forecast more accurately and thus to reduce losses and improve the overall financial solvency of the insurance carrier.

SUMMARY OF THE INVENTION

A method is disclosed for funding future losses incurred by an insurance carrier on workers' compensation claims. Historical data on closed claims is accumulated from the insurance carrier for claims occurring over a set period of years. The claim data is loaded onto a system computer. The claim data is reviewed for discernable data errors and uncorrected claims are purged. The cleansed data is divided into data subsets wherein each subset comprises claims of a predefined type. Each data subset is used to generate an independent statistical model. In generating the models, statistical analysis techniques are applied by a professional statistician to identify claim characteristics which are significant in affecting claim costs.

The generated models are installed onto a designated computer accessible by the insurance carrier. The insurance carrier maintains and updates its active workers' compensation claims on a host computer at the carrier's facility. Periodically, the carrier will apply the statistical models to its active claims to obtain cost and duration predictions by downloading a file containing active claim data to the designated computer.

In applying the models, the significant characteristics of each active claim are analyzed by an appropriate model to generate a cost and duration prediction for each such claim. A hypothetical fund is maintained in order to balance cost predictions between respective claims by providing additional money to underpredicted claims and taking money away from substantially overpredicted claims. Costs incurred on claims are separated into a number of cost categories and cost predictions are proportioned among the cost categories to predict in which areas costs are more likely to be incurred. Reserves are computed for each cost category and the amounts in each reserve may be reproportioned among the cost categories to more accurately reflect actual costs incurred on a claim.

A total reserve is calculated for each claim as the sum of the individual reserve amount of the respective cost categories. An aggregate reserve is calculated as the sum of the reserves of all active claims. The aggregate reserve is used to set a loss reserve account which is used to fund future losses incurred by the insurance carrier on its active workers' compensation claims.

BRIEF DESCRIPTION OF THE DRAWINGS

FIG. 11 is a sample claim summary chart showing the predicted cost and duration values for a hypothetical claim.

FIG. 12 is graph showing a plot of a hypothetical claim characteristic (CHAR) against claim cost (DOLLARS).

DESCRIPTION OF THE PREFERRED EMBODIMENTS

The present invention relates to a system for efficiently and accurately funding future workers' compensation losses to be incurred by an insurance carrier. The funding system is implemented via a data processing system which includes an insurance carrier's computer and a funding system computer. The system computer includes a computer program which implements a portion of the present invention. Typically, the funding system is implemented, and the system computer is operated, by a service-providing organization such as the assignee of the present invention, namely, Risk Data Corporation.

Figure 1:
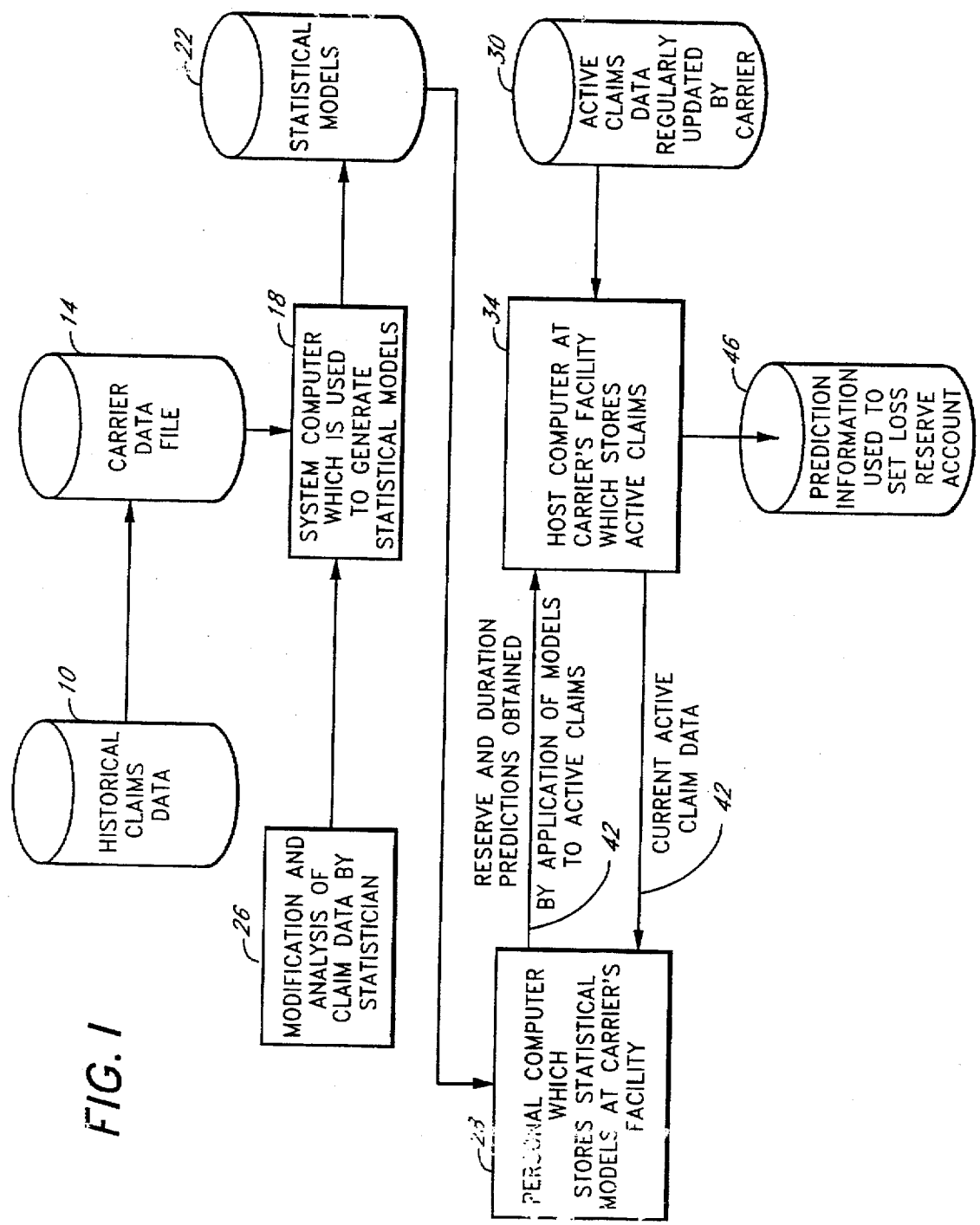
FIG. 1 is a schematic diagram showing the primary elements of the funding system of the present invention.

FIG. 1 is a diagram of the overall funding system for using an insurance carrier's historical claim data to create statistical models and for using the models to predict future incurred costs and durations for that carrier's active workers' compensation claims. An insurance carrier transfers its historical workers' compensation claim data 10 for the previous 10-year period into an ASCII format carrier data file 14. The carrier data file 14 is transferred and loaded onto a system computer 18 maintained and operated by an organization which provides the funding system service to insurance carriers, or, alternatively, operated internally by an insurance carrier. The historical claim data 10 is analyzed and statistical techniques are applied to the data 10 to create statistical models 22 which are later used to predict future costs and durations of the carrier's active workers' compensation claims. In this regard, a professional statistician 26 applies various statistical analysis techniques to the claim data 10 in order to create the statistical models 22. Once the models 22 have been created, the models 22 are installed onto a computer at the insurance carrier's facility. Preferably, this computer is a personal computer 28 dedicated solely to the funding system. The insurance carrier maintains and updates its records on its active workers' compensation claims 30 as a matter of course on a host computer 34 which is typically a multi-function main frame computer maintained by the carrier. Updating of old claims and inputting of new claims is done via keyboard input terminals connected to the host computer 34. The dedicated personal computer 28 which stores the statistical models 22 and the host computer 34 which stores the active claims data 30 are connected via standard data links 42. In order to obtain cost and duration predictions for its active workers' compensation claims, the insurance carrier sends its current active claims data to the models 22 maintained in the personal computer 28. The statistical models 22 operate upon the active claims data 30 and generate loss reserve and duration predictions which are used to calculate a reserve for each individual claim as well as an aggregate reserve amount for all of the carrier's active workers' compensation claims. The aggregate reserve amount is used to set a loss reserve account 46 for funding future losses on the workers' compensation claims.

Figure 2:
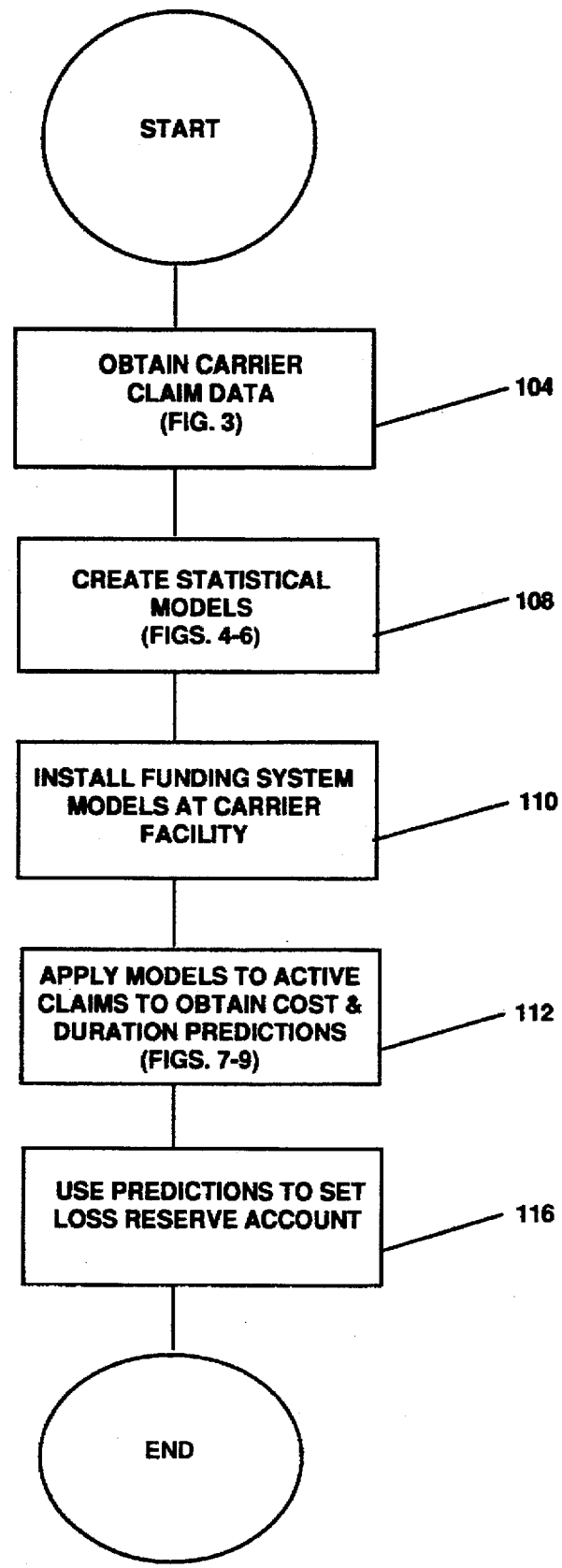
FIG. 2 is a flow chart showing the basic steps of the funding system.

Referring to FIG. 2, which is a flow chart of the overall funding system 100, it can be seen that the funding system 100 performs five basic steps. First, in a step 104, claim history data is obtained from an insurance carrier. Second, in a step 108, the system uses the carrier's claim history to create statistical models. Third, in a step 110, the funding system models are installed at the carrier's location. Fourth, in a step 112, the models generated in step 108 are used to analyze the carrier's active claims in order to predict costs and durations for those claims. Fifth, in a step 116, the cost predictions are used to set a Loss Reserve Account for that carrier.

I. Acquiring Carrier Claim Records

Figure 3:
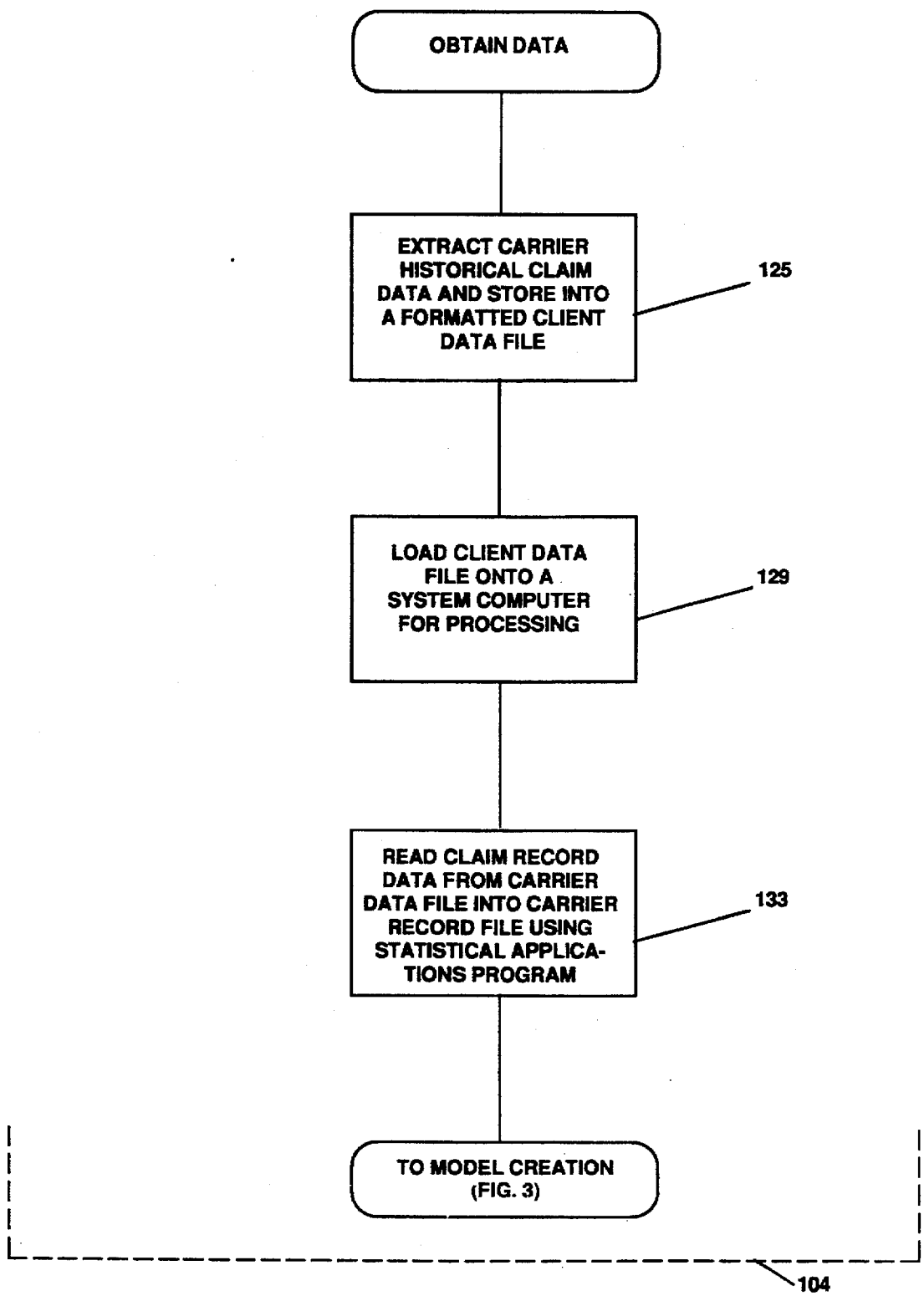
FIG. 3 is a flow chart showing the steps of obtaining historical claim data.

FIG. 3 is a flow chart illustrating the step 104 of FIG. 2 in more detail. With respect to any given insurance carrier, the system for funding future workers' compensation losses first includes a process of obtaining and analyzing historical claim data from that carrier. To this end, the carrier must submit, in proper format, open, closed, and resolved claim records representing the history of preferably all workers' compensation claims administered by that carrier over a period inclusive of the previous ten (10) years. Since insurance carriers retain and store such historical claim data as a matter of course, normally in the form of computerized data storage media, it is only required that the claim records be extracted and formatted so as to be readable by software used by the system computer in model development.

Typically, a broad spectrum of claim information is stored by the insurance carrier. For example, some of the more pertinent claim information stored for each claim includes the following:

CLAIM NUMBER claim number identifying the claim record;

DATE OF INJURY date the injury occurred;

CLASS CODE standardized classification code designating injured worker's job industry;

BODY PART industry standard body part injury code;

NATURE OF INJURY industry standard code for nature of injury, e.g., burn, sprain, fracture, etc.;

CUMULATIVE TRAUMA boolean variable designating whether injury is nontraumatic and occurs over a period of time;

DATE OF BIRTH the birth date of claimant;

CLAIM STATUS status of claim, i.e., open, closed or resolved;

DATE CLAIM CLOSED date claim was closed;

DATE CLAIM RESOLVED date claim was resolved;

REOPENED CLAIM boolean variable indicating whether claim was closed and subsequently reopened;

INJURY TYPE injury type under standard classification system (see discussion below);

LITIGATED boolean variable indicating whether claim was litigated;

AWARD TYPE type of award ultimately resulting from settlement of claim where: compromise and release=1, findings and award=2, stipulated award=3, dismissal or take nothing=4, and other=5;

VOC REHAB boolean variable indicating whether vocational rehabilitation costs were incurred;

EMPLOYER'S LIABILITY boolean variable indicating whether employer's liability was involved;

TEMP DIS INCURRED total temporary disability charges incurred;

PERM DIS INCURRED total permanent disability charges incurred;

TOT IND INCURRED total indemnity incurred on claim;

V. R. EVAL INCURRED vocational rehabilitation evaluation expenses incurred;

V. R. DIS INCURRED vocational rehabilitation disability expenses incurred;

V. R. TRAIN INCURRED vocational rehabilitation training expenses incurred;

TOTAL V.R. total vocational rehabilitation expenses incurred;

TOTAL MEDICAL total medical costs incurred;

TOTAL ALLOCATED total allocated loss expenses incurred;

TOTAL SUBRO total subrogation recoveries for claim;

ZIPCODE claimant's zip code;

P. D. RATE weekly permanent disability rate; and

T. D. RATE weekly temporary disability rate.

These variables are not exclusive and may vary depending upon the particular insurance carrier's claim record archiving practices.

With respect to the INJURY TYPE variable, an insurance industry-wide, standard classification system is used. This injury classification system is set forth in each individual state's Workers' Compensation Unit Statistical Plan. Under this system, 1=industrial-related death, 2=100% total permanent disability, 3=major partial (25%–99%) permanent disability, 4=minor partial (1%–24%) permanent disability, 5=temporary total or temporary partial disability, 6=medical expenses only, 7=minor injuries handled in groups via contracted medical services, and 8=closed death claim.

To obtain the claim records, data formatting specifications are provided to the carrier which detail the format in which the workers' compensation claim records data must be presented. Preferably, the data will be put into ASCII format in data fields specified by a system operator. The carrier may obtain or write a computer program to extract the requested relevant data from data files on its own data storage media. In a step 125, the claim record data is put into a Carrier Data File in the format specified by the system operator. In a step 129, the Carrier Data File is loaded onto the system computer for processing. In a step 133, the system computer is instructed to read in the historical claim record data into a claim Record File. The claim records are normally read into the claim Record File using a commercially available statistical applications program, preferably Statistical Analysis System (SAS) published by SAS Institute, Inc. of Cary, N.C.

II. Model Creation

A. Review of Historical Claims File

Figure 4:
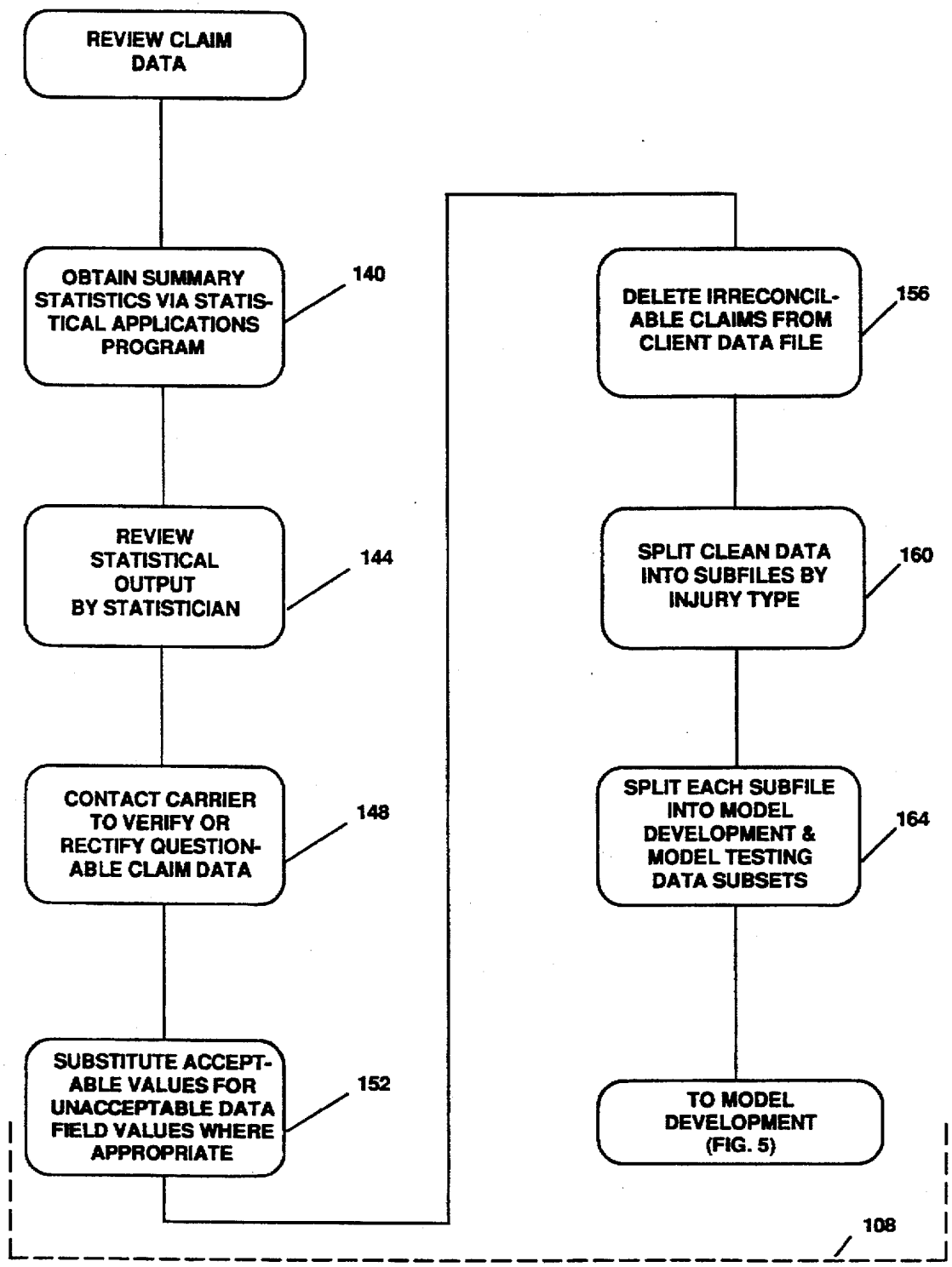
FIG. 4 is a flow chart showing the steps of reviewing and organizing historical claim data in the model creation process.
Figure 5:
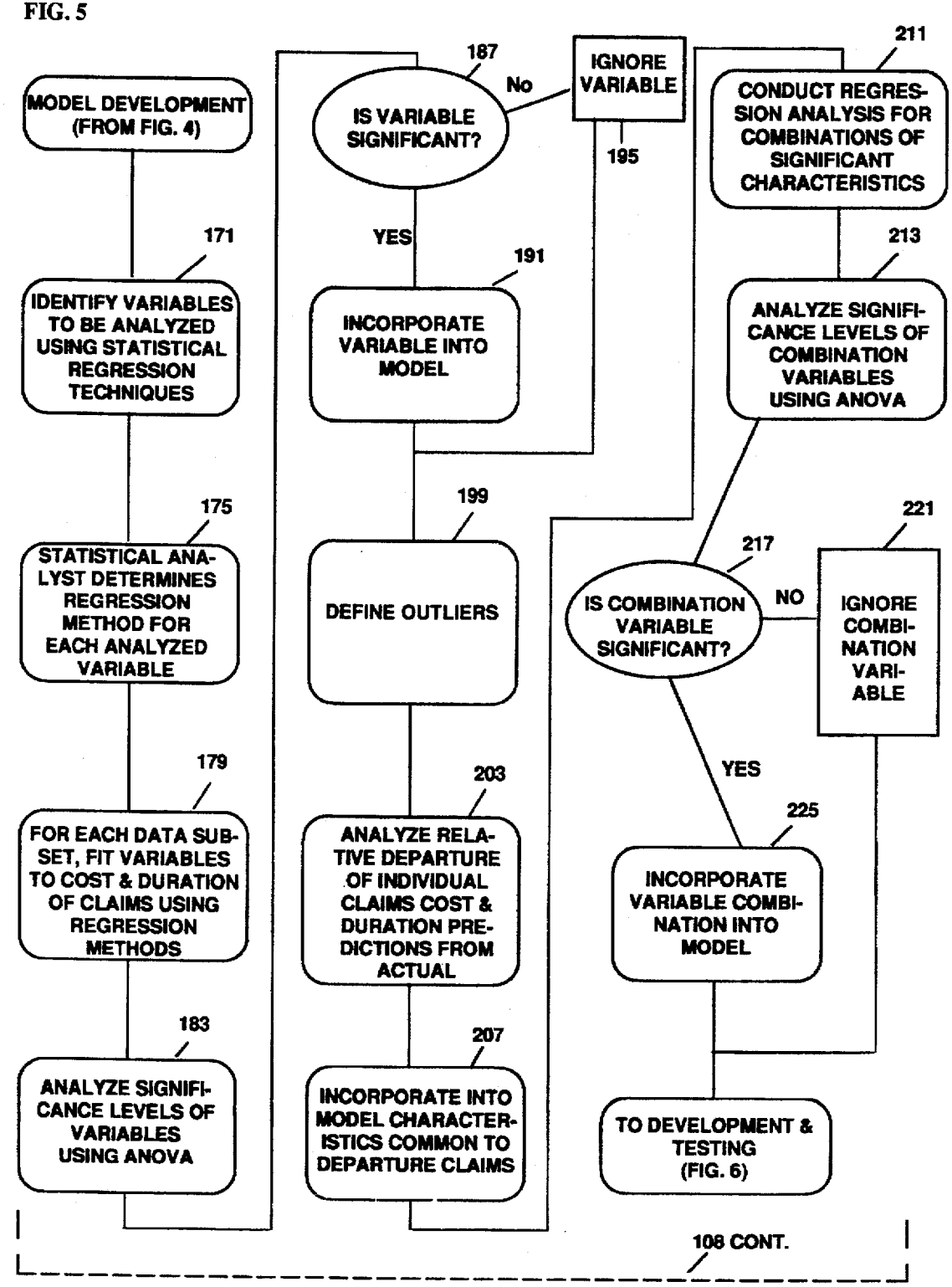
FIG. 5 is a flow chart showing the steps of development of the statistical models.
Figure 6:
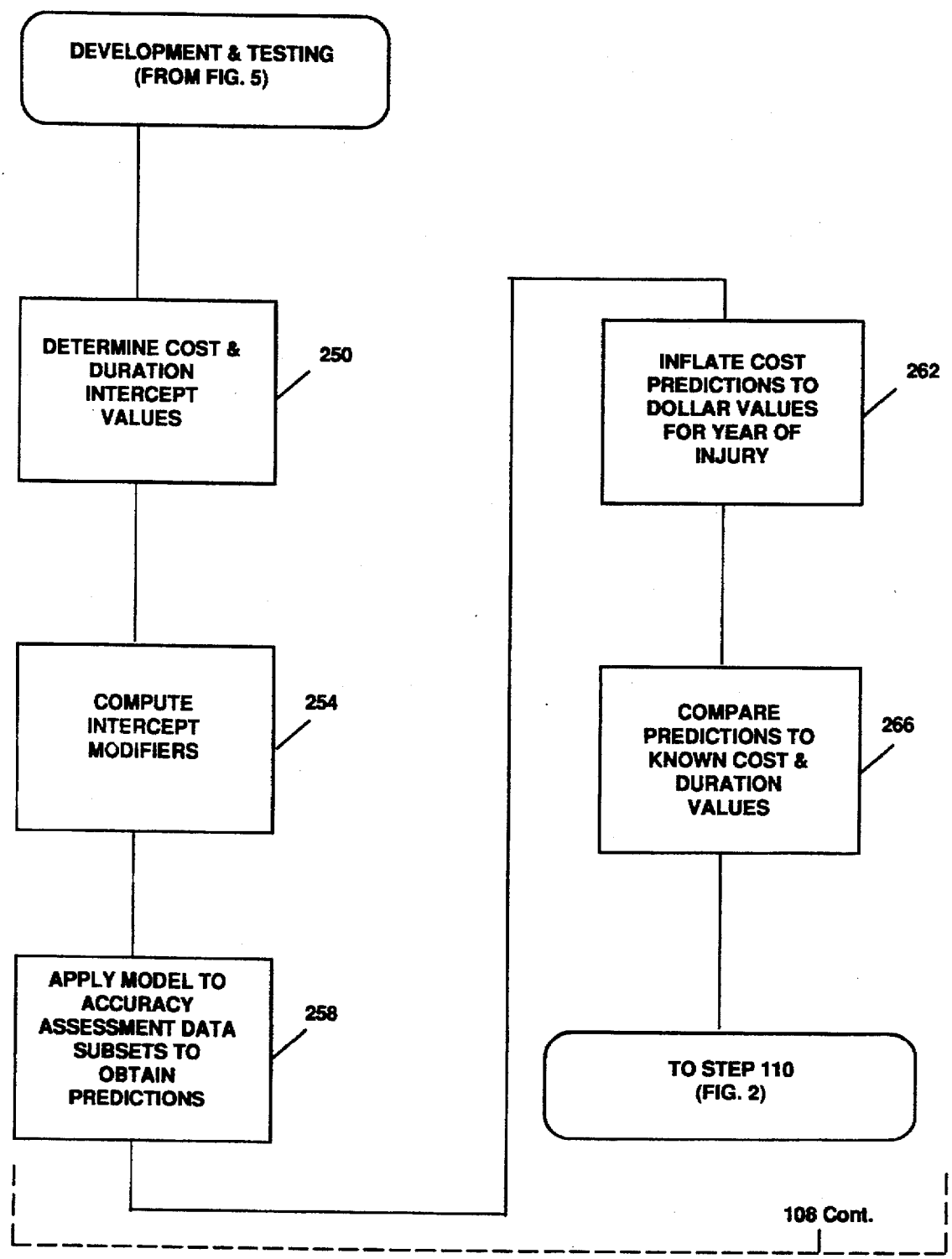
FIG. 6 is a flow chart showing steps of model development and the steps model testing.

FIGS. 4, 5, and 6 are more detailed flow charts of the statistical model creation step 108 of FIG. 2. Model creation begins with the review of the historical claims file provided by the carrier. The review serves two main purposes: to cleanse the data and to familiarize the analyst with the data. Due to the likelihood that large quantities of data will contain numerous errors, whether reporting, clerical, computational or otherwise, the claim records data must undergo a preliminary quality control analysis which searches the data of each individual claim record for errors. Recognizable errors include variables containing invalid codes, inconsistent codes, improper negative values, illogically high dollar values, etc. For a statistical analyst, or statistician, to become familiar with the data, extensive exposure to the content of the data is required. Questions like the amount of missing data, range of dollar values, diversity in INJURY TYPEs, etc., are answered which provide the basis for understanding the underlying nature of the data. This review process assures that corrupt data does not pass by the analyst's scrutiny.

The review process is initiated in a step 140 by reading the historical file using a statistical applications program such as SAS. Procedures within SAS provide summary statistics for all variables in the file. The summary statistics produced by SAS include, but are not limited to, means, variances, correlations, minimums and maximums for continuous variables (e.g., dollar fields), and contingency tables (both one-way and multi-way) for discrete variables (e.g., BODY PART). In a step 144, a statistician reviews the SAS-produced output for data reasonableness. Invalid codes are identified by comparing codes in a carrier-provided data dictionary (which describes the contents of the file and valid codes which may be assigned to specific fields) with the values found by SAS. Inconsistent codes are identified by cells within contingency tables which should be empty (e.g., open claims showing a date of closing) and by inconsistent combinations of INJURY TYPE and dollars paid fields (e.g., medical only type claims should not have dollars paid toward indemnity).

Improper negative values include negative values found in most all fields. For example, costs incurred on workers' compensation claims may be separated into four basic "Cost Categories." These four Cost Categories are total indemnity, total vocational rehabilitation expenses, total medical costs, and total allocated expenses. Allocated expenses include miscellaneous costs such as court costs, attorneys' fees, etc. For the purposes of the present funding system, closed claims having no costs incurred are not used in model generation. To this end, closed claims having a total claim cost equal to zero, thus indicating no money having been paid out on any of the four Cost Categories for that claim, are flagged. More specifically, claims are flagged where the sum of the total indemnity, total vocational rehabilitation expenses, total medical costs, and total allocated expenses is zero.

Illogically high dollar values are typically paid out values (e.g., TOTAL-MEDICAL) exceeding rational amounts given the nature of the injury. Inaccurate totalling of cost fields is identified by constructing aggregate individual cost values by adding up the components which constitute the particular aggregate cost. Thus, the data cleansing process strives to check the quality of the carrier's historical claims file.

The data review process leads to the identification of claim variables which do not meet expected values. Cross verification of redundant and/or similar variables within a given claim often resolves data problems. In a step 148, the carrier may be contacted to verify or rectify questionable values. Should resolution of "bad data" prove insurmountable, the claim is flagged for future review. It may later be decided to recode values with acceptable replacements in a step 152 (e.g., the mean for the same type of claims or a missing value flag), or, ultimately, the claim may be deleted from further analysis in a step 156. Accordingly, the resolution process may be repeated depending upon the available resolution options and the resulting impact on modeling integrity. Thus, ultimate "bad data" resolution is left to a professional statistician.

B. Generation of Analysis Ready Data Subsets

To the extent that all data integrity issues have been resolved, the culmination of the review process leads to the generation of an analysis ready data set. SAS is programmed to extract data from the Carrier Data File for analysis. In most states the analysis ready data set may include claims from a number of insurance carriers. This is because a single carrier may not possess enough claims data for model development purposes. The extraction incorporates logic to resolve data problems where possible, generates additional variables through redefinition/combination of existing variables (e.g., lower back BODY PART where the claim was LITIGATED), adjusts dollar values for inflation using the Consumer Price Indices (CPI) as provided by the Bureau of Labor Statistics (BLS) for local area and major industry, and, in a step 160, splits the file into subfiles, based upon claim INJURY TYPE, and reformats the resulting subfiles to more efficiently interface with subsequent analysis software.

Since the data in the claim records comprising the initial analysis ready data set are taken from claims administered by the carrier over the most recent 10-year period, the various monetary amounts paid out on those claims are a result, to a significant extent, of inflationary factors. For example, a claim for an injury which occurred in 1980 would have significantly less paid out amounts than an otherwise identical claim which occurred in 1989. Thus, in order to obtain accurate cost predictions for claims (duration is not effected by inflationary factors), all cost values for the claims in the various claim record sets must be deflated so as to represent the respective costs of each claim as if each claimed injury occurred in the first year of the 10-year claim sample period. Thus, if claim records for injuries occurring for the period 1980 to 1989, inclusive, are used by the program in creating a statistical model, then the costs incurred on each claim must be deflated to yield corresponding 1980 dollar values. In this regard, the Consumer Price Indexes are used to determine appropriate inflation, and hence deflation, values for each appropriate year during the 10-year claim sample period. Inflationary statistics used may be those representing nation-wide inflation or only state-wide inflation, depending upon the desired model application. In most cases, the inflation indexes for the state in which the carrier conducts its business is used, thereby obtaining more reliable cost predictions for that particular carrier's workers' compensation claims.

Derivation of the inflation adjustments for dollar values involves tailoring BLS supplied CPI's to better reflect inflation activity in workers' compensation costs. Each claim's total cost is adjusted according to the components of the total costs. For example, the medical portion of total cost is adjusted using a medical price index; the indemnity portion of total cost is adjusted using an indemnity price index; etc. The price indices are extracted from BLS publications for local area and industry behavior. Thus, the inflation compensation procedure employed more accurately represents the economic activity applicable to each specific claim. Assuming a sufficient amount of available raw claim data, in a step 164, the program randomly divides each of the INJURY TYPE specific subfiles into two groups; one data subset is for model development and the other data subset is for model accuracy assessment. The relative portions split into the model development data subsets and the model accuracy assessment data subset is carrier dependent. However, the minimum proportion split into each model development data subset is 80% of the claims supplied by the insurance carrier for the corresponding INJURY TYPE. For example, a minimum of 80% of the reported medical only claims are selected for the model development data subset for medical only claims; a minimum of 80% of the reported minor partial permanent disability claims are selected for the model development data subset for minor partial permanent disability claims; etc. Preferably, the minimum sample size of a model development data subset (denoted N) is determined by:

$$N=(40 \times s/X)^2$$

where "X" is the sample mean claim costs and "s" is the sample standard deviation of claim costs, where the sample mean and standard deviation are determined for each INJURY TYPE. For example, if the sample mean of claim costs for temporary disability claims is $900 with a sample standard deviation of $1350, the minimum sample size for the model development data subset of temporary disability claims is 3,600 claims. The model development data subsets used subsequently form the basis from which models are developed to predict claims costs and durations.

Specifically, a first data subset, or Medical Only, designates all claims wherein only medical expenses were paid out by the insurance carrier and comprises those claims wherein INJURY TYPE=6. A second data subset, or Temporary Disability, designates those claims wherein the claimant suffered a temporary, as opposed to permanent, disability, whether that disability be total or partial. The second data subset comprises those claims wherein INJURY TYPE=5. Finally, a third data subset, or Permanent Disability, designates those claims wherein the injury to the claimant is permanent, whether the injury is major or minor. The third data subset comprises those claims wherein INJURY TYPE=3 or 4.

C. Model Development

Referring now to FIG. 5, models are developed for each of the three INJURY TYPE data subsets (Medical Only Claims, Temporary Disability claims and major and minor Permanent Disability Claims). Each model is created apart from and independent of the other two models. Because a given model is developed from data having a common INJURY TYPE, each respective model will advantageously provide a more accurate representation, or model, of the likely costs and durations of other claims having a like INJURY TYPE, namely, currently open or active workers' compensation claims administered by the insurance carrier. In this manner, an insurance carrier will be provided with more accurate predictions of future costs and durations of its active claims.

The procedure to develop the models, however, is common to all data subsets, and, for each of the INJURY TYPE data subsets, the following model development strategy is conducted. This approach is followed for insurance carrier specific models, as well as for state models where more than one carrier's data is used.

The general approach is to apply regression analysis techniques to each data subset to create a separate model corresponding to each data subset. For these purposes, regression analysis is the establishment of a model which defines the relationship between claim characteristics and claim cost and duration.

Statistical regression techniques are well known to those skilled in the field of statistical analysis and are discussed in numerous texts, for example: "Applied Regression Analysis" by Norman Draper and Harry Smith, Wiley Publishing, 1981. Draper and Smith provide a broad discussion of regression analysis concepts.

Both open and closed claims are used in model development. For this application, when dealing with both open and closed claims, not all costs are known to open claims when extracted from the carriers historical files. This lack of information, however, does not imply no information; but only that the information is partial. The specifics of merging partial information with complete information is discussed in many references; two of which are "Sample Selection Bias as a Specification Error," Econometrica, Vol. 47, January 1979, by James J. Heckman; and "Statistical Models and Methods for Lifetime Data," Wiley Publishing, 1982, by J. F. Lawless. A variety of available analytical tools are used for each carrier and their particular data subsets. The specifics of model development dictate the appropriate tools to use. Since the characteristics and availability of data vary from carrier to carrier, the detailed procedures used for one carriers models may not be appropriate for another carrier's models. Therefore, the following description of the model development procedure is generic in nature. For state modeling purposes, variables are identified to be those which are available from all carriers.

Model development involves a first step 171 of finding a functional relationship of claim characteristics or variables (e.g., nature of injury, body part affected, hospitalization involved, attorney involvement, etc.) to claims costs and durations. Let "X" denote variables, let "f(X)" denote a function of X, and let "Y" denote either claim cost or duration. The procedure is to find the appropriate set of variables and a function, f, which best predicts Y. FIG. 12 shows a plot of a generic claim characteristic (CHAR) against the claim cost (DOLLARS) for a sample of closed claims. Visual examination of the trend in the data shows that as the characteristic increases, so does the claim cost. Thus, the trend may be summarized by a straight line. Therefore, in a step 179, each potential variable is first independently fit to cost and duration using the following linear relationship:

$$Y = b_0 + (b_1 \times X)$$

(see Draper & Smith, section 1.1) where $b_0$ is the intercept of the line and $b_1$ is the slope. The fit is accomplished using the least squares method (see Draper & Smith, section 1.2). This step or method determines each potential variable's statistical significance in predicting cost and duration of claims in the same data subset. Depending on the statistician's conclusions, different variables or functions of variables may be applied in analyzing the data subsets in a step 175 to generate models. For example, a log model may be fit to the data (i.e., Y=Exp (X)) (see Draper & Smith, section 10.2). There are a substantial number of possibilities for potential functional forms for analyzing potential variables and the application thereof to the present method will be known to those skilled in the art.

The following variables have been found to be of particular significance with respect to prediction of costs and duration for workers' compensation claims, and thus are commonly used as variables in model development: CLASS CODE; BODY PART; NATURE OF INJURY; REOPENED CLAIM; INJURY TYPE; LITIGATED; VOC REHAB; BIRTH DATE GROUP (a variable set for each claim record categorizing the date of birth into one of 4 categories); and SUBROGATION (claims involving subrogation recovery). Although, these variables are by no means exclusive, they are deemed to be highly probative in predicting future costs and durations of workers' compensation claims.

In addition, in a process step 183, ANalysis Of VAriance (ANOVA) techniques, described in section 1.3 of Draper & Smith, are used by the statistician to determine the significance levels of variables in predicting claims costs and durations. ANOVA is a technique whereby the amount of variation in claim cost and duration explained by each claim characteristic is quantified and compared to the total variation in cost and duration. The goal is to identify those variables or combination of variables which explain the bulk of the variation in claim cost and duration. Included in the process step 183 is a test for the adequacy of the model. Examination of residuals (actual cost/duration minus predicted cost/duration) for their consistency with model assumptions helps determine the quality of the generated model. Plotting the residuals provides a means for visually analyzing and measuring the quality of the model. Interpretation of the plots is left to the professional statistician. If a variable is judged by the statistician to be significant for purposes of claim cost and duration prediction in a decision step 187, it is incorporated into the model in a process step 191. Otherwise, that variable is ignored in a process step 195.

In a process step 199, the system of the present invention also defines Outliers which are identified as those claims whose residual exceeds bounds encapsulating 95% of the variation in the data. For example, the bounds may be computed to be plus or minus $2,000 (i.e., actual claim cost minus predicted claim cost is less than +$2,000 and greater than −$2,000 for 95% of claims), and accordingly, claims with residuals greater than +$2,000 or less than −$2,000 would be flagged as Outliers. The statistician may decide to eliminate Outlier claims from inclusion in model development due to their aberrant nature.

In addition, the relative departure of individual claims' predicted cost/duration from those claims' actual cost/duration may attract attention to such claims by the statistician in a process step 203. For example, relative departures of more than 10% (i.e., a ratio of predicted to actual of less than 90% or greater than 110%) invoke specific attention to the specific characteristics of the subject claims. In a process step 207, if one or more characteristics are common to those departing claims, those characteristics are incorporated into the model as variables, thus effectively identifying and, thus, eliminating the source of departure.

The univariate (1 variable) regression analysis described above establishes the structure of the remaining analysis. In a process step 211, the system examines the effectiveness of various combinations of variables in predicting claims costs and durations. The statistically significant individual variables identified during the univariate analysis, or Significant Characteristics, form the set of variables which may be combined to more effectively predict claim costs and durations. The particular combinations of variables selected for regression analysis are determined by the statistician based upon experience and expert knowledge in the field. For example, with respect to any given data subset, the analyst may instruct the system computer to perform a regression analysis on all claims in that given data subset which were litigated (LITIGATED="yes") and wherein the injured body part was the claimant's spinal cord (BODY PART=23). The statistician may also, for example, instruct the system to perform a regression analysis on the claims in a given data subset wherein the claimant's birth year was prior to 1930 (DATE OF BIRTH<1930) and wherein the vocational rehabilitation expense is greater than $1,000 (TOTAL V. R.>1,000).

With respect to each regression analysis performed by the statistician, the results of the analysis are shown to the statistician, preferably on a computer screen. The results of the regression analysis indicate to the statistician the extent to which the variable combination(s) has had an impact on the ultimate incurred costs and/or duration for the analyzed claims in the given data subset. The respective importance of the variable combinations is tested using ANOVA and their future usefulness determined accordingly in a process step 213. If the impact of a given variable combination is small or not statistically significant, as determined by the statistician in a decision step 217, then the regression analysis results on that variable combination may be ignored in a process step 221. If, however, in the decision step 217, a given variable combination is determined to significantly predict ultimate total incurred claims costs or durations for a given data subset, then that particular regression analysis is stored by the system in a process step 225 to be used to forecast the future incurred costs on active workers' compensation claims having the same INJURY TYPE. Individual variables or variable combinations which are so used by the program are called Significant Characteristics.

The functional form (linear, log, etc.) determined by the univariate analysis is employed in this multivariate (multiple variable) regression framework. The content of the equation and how well it predicts is also determined by the professional statistician. Starting with only a mean value (an intercept), variables are systematically added to the equation, both individually and in combination with others (discussed below in further detail). The process of repeating the procedure of adding, subtracting and combining variables in the process step 225 continues until the statistician establishes the best fit within the confines of the selected functional form and estimation technique.

The various univariate and multivariate regression analyses performed thus far by the system are collectively used to create an independent model for each of the mutually exclusive INJURY TYPE data subsets. The models form a basis for predicting the future costs to be incurred on workers' compensation claims of the same INJURY TYPE. The first model is created by the system to predict future costs and durations on Medical Only Claims, namely claims having INJURY TYPE=6. The second model is created to predict future costs and durations on Temporary Disability claims. Finally, the third model predicts costs and durations on major and minor Permanent Disability claims.

FIG. 6 illustrates a flow chart of the development and testing portion of the process step 108. In a process step 250, a cost Intercept Value and a duration Intercept Value is determined for each of the three independent models. Each Intercept Value represents a base cost or duration prediction for that particular model. Preferably, each Intercept Value represents respectively the mean cost/duration value for all claims in the appropriate data subset, and serves as a base value for ultimately calculating a cost (or duration) prediction for that claim. For example, with respect to the major and minor Permanent Disability model for a given insurance carrier, a cost Intercept Value of $88,500 might be calculated as the mean cost incurred for all the claims in the major and minor Permanent Disability claims data subset. With respect to the Medical Only model, the cost Intercept Value will be designated as the average total medical costs incurred for claims in the Medical Only data subset (namely INJURY TYPE=6).

In a process step 254, the regression analyses performed by the system in conjunction with the statistician, whether univariate or multivariate, result in the generation of a positive or negative Intercept Modifier for each respective variable or variable combination which is a Significant Characteristic. During prediction, each Intercept Modifier will be applied to the claims having the corresponding INJURY TYPE. The respective appropriate Intercept Modifiers are added or subtracted from the Intercept Values for each predicted claim depending upon that claim's characteristics to obtain a cost or duration prediction for that claim. In the case of a positive Intercept Modifier for a particular INJURY TYPE, for example Medical Only Claims, the applicable Intercept Modifier is added, for each active claim in that INJURY TYPE having the corresponding characteristic, to the Intercept Value for that INJURY TYPE to obtain an ultimate predicted Total Cost Incurred for that active claim. Similarly, with respect to negative Intercept Modifiers, the applicable Intercept Modifier for a given characteristic or characteristic combination which has been determined using regression analysis to be a Significant Characteristic, is subtracted from the Intercept Value to obtain the Total Cost Incurred prediction for active claims in the same INJURY TYPE which have that characteristic. Appropriate Intercept Modifiers are similarly applied to the predicted duration of claims in order to obtain a claim duration prediction. A sample application of Intercept Modifiers to an Intercept Value to obtain a Total Prediction is shown in the following example:

| Injury Type 5 Model | |
|---|---|
| Intercept Value | +$2,537 |
| Intercept Modifiers | |
| Body Part, #42 | −92 |
| Nature of Injury, #52 | −41 |
| Birth Date Group, #4 | +0 |
| Allocated, No | +0 |
| Litigated, Yes | +710 |
| Total Prediction | $3,114 |

Once the various Intercept Modifiers have been appropriately added or subtracted to the cost Intercept Value for the corresponding model, then a Total Cost Incurred prediction has been determined for that particular claim. Similarly, the duration Intercept Modifiers are added to or subtracted from the appropriate duration Intercept Value to obtain a duration prediction for that claim.

In order to appropriately apply the respective models to the data contained in claim records during the prediction process in the ultimate application of the program, the predicted cost values (in base year dollars, e.g., 1980) must be reinflated to current dollar values once they have been determined. Since the predicted cost values are all determined as if each subject claimed injury occurred in the first year of the subject 10-year sample period (for example, 1980 where the period is 1980–1989), each resulting cost prediction must be reinflated a minimum of 10 years to obtain present day dollar values. To this end, all predicted dollar values are inflated to present day dollar values using the identical publicly available medical, health, and workers' compensation cost indexes (e.g., CPI) which were previously used to deflate the claim dollar values to the first year of the claim sample period.

In a process step 258, the previously generated INJURY TYPE specific models are tested for accuracy. For this testing, the program uses the claim records from the model accuracy assessment data subsets (see FIG. 4, step 164) which were previously randomly parsed out from the INJURY TYPE subfiles groups determined to be acceptable or "clean" (those claims which passed the quality control analysis, or, data integrity testing). In the process step 258, the three independent models are actually applied to the Significant Characteristic variable values in the correspondingly independent model accuracy assessment data subsets to predict the respective costs and durations of these previously unused claims. The accuracy of each of the models may be precisely determined because the tested claims have been closed and the actual costs and durations of those claims are known values. To obtain accurate dollar values for cost predictions, the appropriate inflationary factors are applied to the predicted values for each claim in order to convert the starting year dollars into appropriate dollar values for the respective years in which the respective claimants in those claims were injured in a process step 262. In determining the accuracy of each respective model, the predicted costs for the testing sample claims are summed and compared to the sum of the actual costs for those claims in a process step 266. The resulting ratio provides an accuracy measure for each model's ability to correctly predict claims costs and durations. For example, if the predicted aggregate claims costs total $11,000 and actual aggregate claims costs totaled $10,000, the model has predicted to within 10%. A corresponding ratio is computed for claims' duration.

III. Application of Models to Predict Claims Costs and Durations

Figure 7:
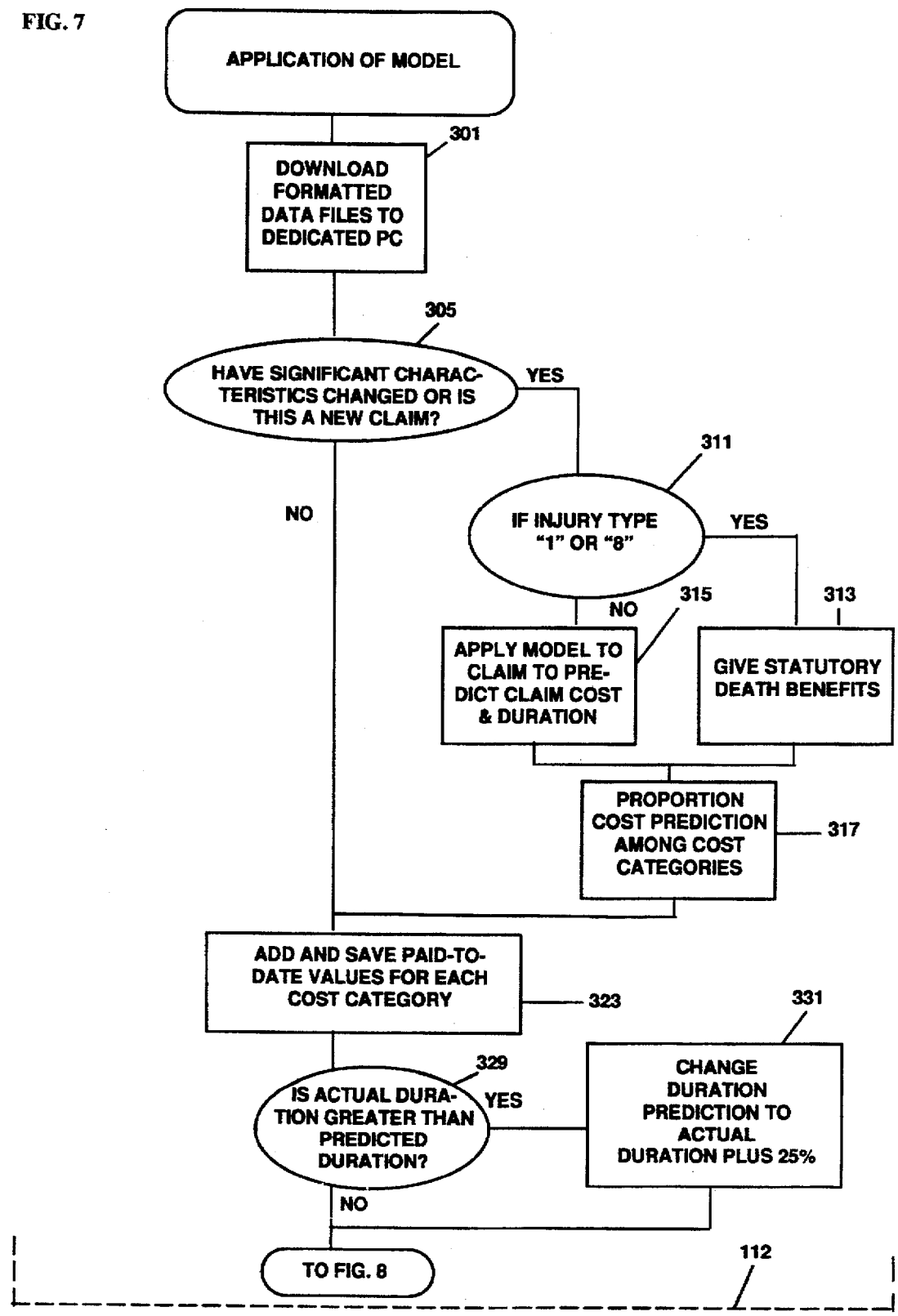
FIG. 7 is a flow chart showing the application of statistical models to predict the cost and duration of active workers' compensation claims.
Figure 8:
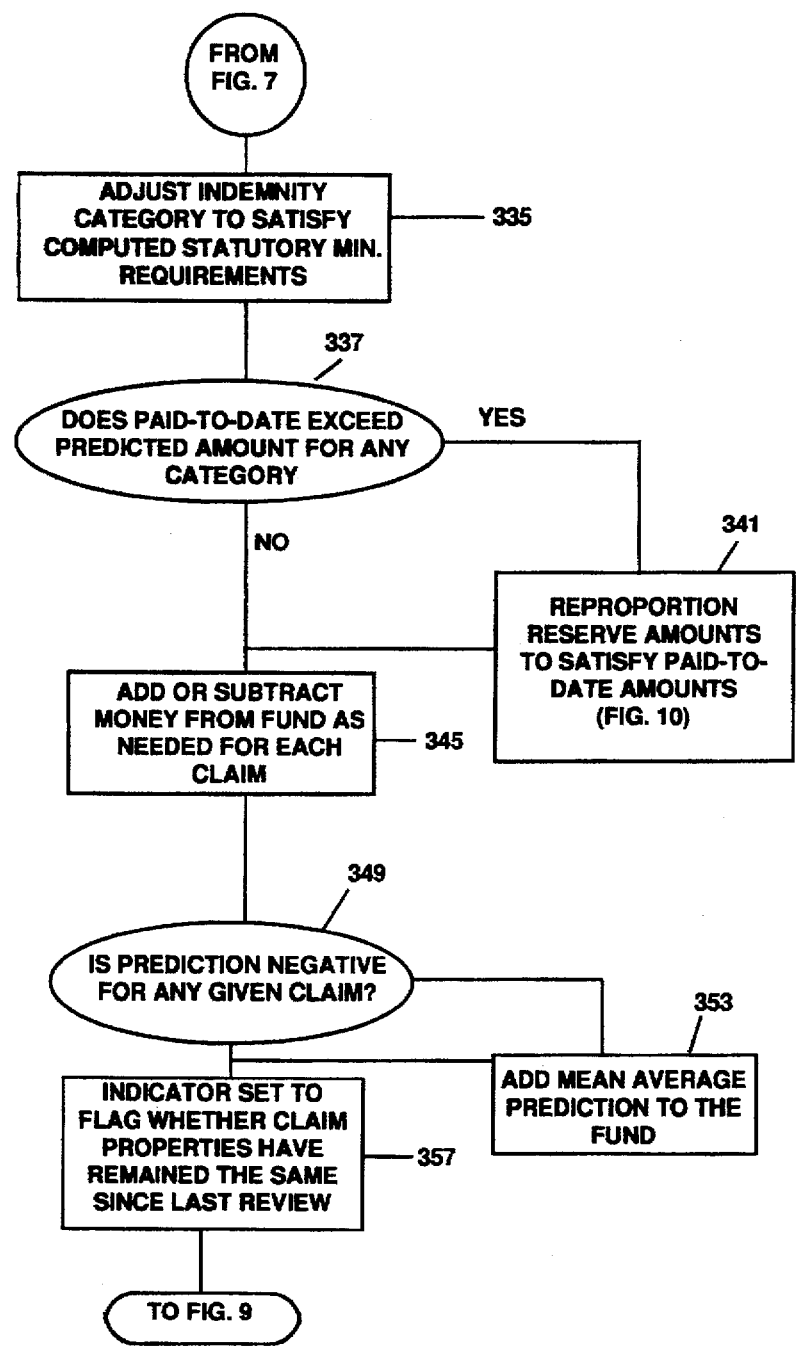
FIG. 8 is a flow chart which is a continuation of the flowchart in FIG. 7 showing the application of the statistical models.
Figure 9:
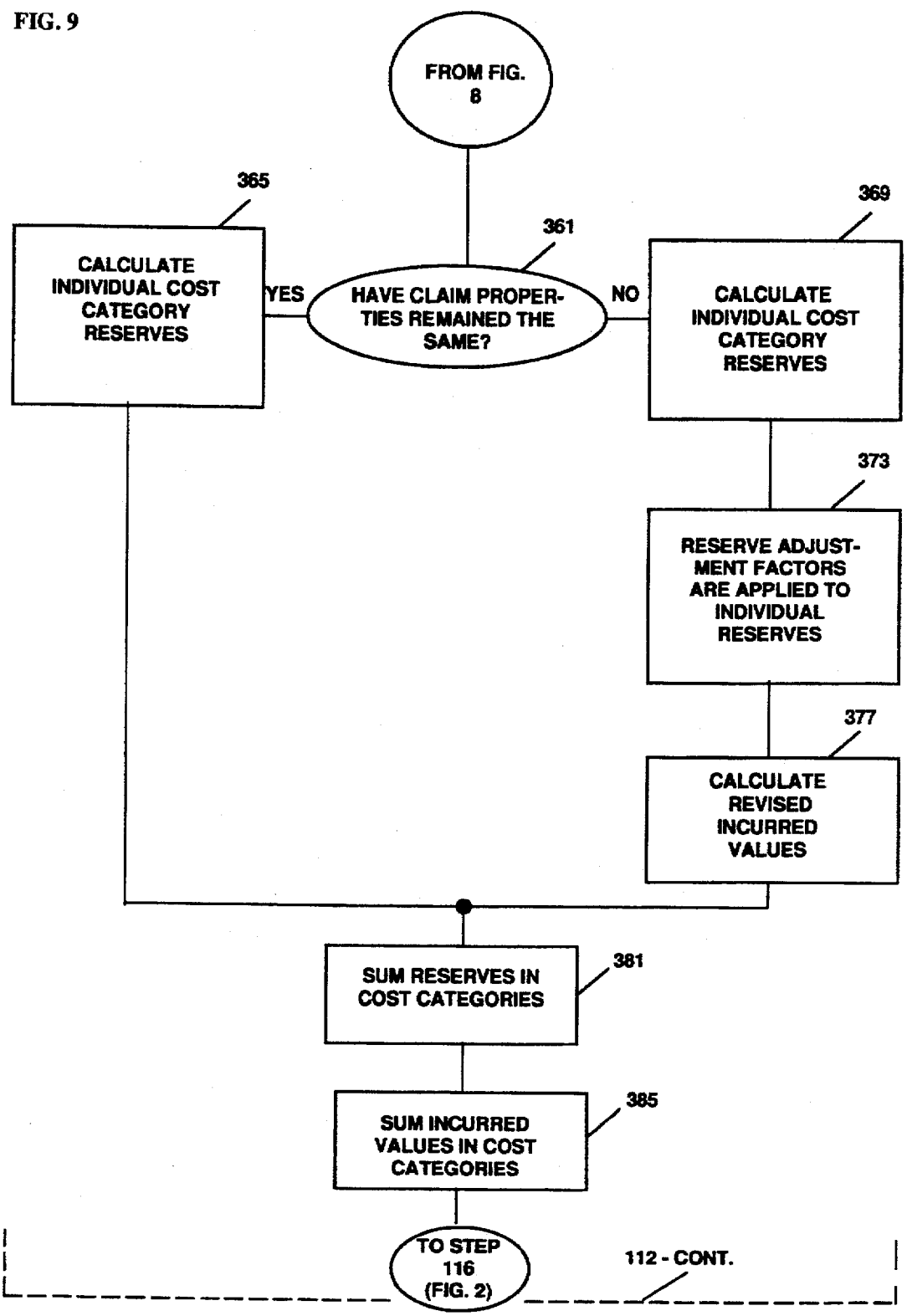
FIG. 9 is a flow chart which is a continuation of the flowchart in FIG. 8 showing the application of the statistical models.

A. Carrier Interaction with System.

once the claim data has been collected from the insurance carrier in the process step 104, and an appropriate set of models have been distilled therefrom by the system in the process step 108, the models may then be put into application, by installation of the models at the carrier's location in a step 110, in order to forecast the costs incurred and duration of the insurance carrier's active workers' compensation claims in the process step 112. The process step 112 is shown in more detail in FIGS. 7, 8 and 9.

In the preferred embodiment of the present invention, claim prediction using the models is accomplished via direct communication between a host computer at the insurance carrier's facility, for example, a carrier's multipurpose mainframe computer, and a PC dedicated to the program also located at the carrier's facility. The three models for a given carrier are maintained and stored on the aforementioned dedicated PC and are accessible by the host computer via a direct data communication line. The insurance carrier will maintain its claim record in data files on the host computer in the course of its business. A separate computer program resides in the host computer which converts the carrier's data files into a format readable by the program, as described previously. Such formatted information is downloaded to the PC in a process step 301 to obtain model predictions. After formulating claim predictions, the system creates an upload file containing such predictions which is uploaded to the host computer and may then be accessed by the carrier.

Some insurance carriers may wish to access the models on the designated PC on a daily, weekly, or monthly basis, or upon any other desired frequency. By accessing the models and applying the models to its most current workers' compensation claim records, the insurance carrier will obtain the most current and up to date predictions for future costs and duration on its active workers' compensation claims. It may be desirable for the carrier to frequently update its claims costs and duration predictions since the status of and available data on its active workers' compensation claims is dynamic and continuously changing. Thus, daily access is the preferred method for obtaining the most up to date prediction values.

The three INJURY TYPE models are used both to predict the future costs incurred on new workers' compensation claims, as well as to update and/or revise predictions on previously analyzed claims. With respect to new claims, the insurance carrier enters, via its own host computer, and in the course of its own administrative record-keeping, all the pertinent data for those claims into claim records. These records are stored in data files on the host computer. The claim record is preferably stored in the form of data fields standard in the insurance industry and which closely correspond to data fields or variables recognized and used by the program on the dedicated PC. In this manner, the insurance carrier may easily provide the required claim information to the system, as described above, for cost and duration predictions using the models. Once a new claim has been entered by the insurance carrier into a claim record on the host computer, a Total Cost Incurred prediction and duration prediction for that workers' compensation claim will be obtained via the appropriate model the next time the dedicated PC is accessed by the insurance carrier. When this is done, the Total Cost Incurred prediction and duration prediction is obtained for each active claim in the manner previously described.

B. Reserve Adjustment Factors.

The present system includes a means for adjusting the predicted reserve amounts in accordance with carrier experience and preference. For groups of claims having like injury years, the insurance carrier may enter into the system a Reserve Adjustment Factor. The Reserve Adjustment Factor is a multiplier or percentage specified by the insurance carrier to be added to each claim in the designated claim group or groups. This multiplier is adjusted on the total reserve amount ultimately calculated for claims in the designated group. For example, if a carrier has reason to believe that a given group of claims having a like injury year is likely to incur greater than normal costs, or if the carrier wishes to pad the reserve amount for those claims as a safety margin, then the carrier might enter a Reserve Adjustment Factor for that claim group of, for example, 1.25. This Factor will act as a multiplier to the total calculated reserve amount such that the reserve amount is increased by 25% for that claim. Reserve Adjustment Factors may be entered or updated by the carrier at any time by accessing the system on the dedicated PC.

C. Using Independent Models to Calculate Reserves

The present system calculates a separate Reserve amount for each of the four Cost Categories, namely, medical expenses, indemnity expenses, vocational rehabilitation expenses, and allocated expenses. For each respective Cost Category, the Reserve Amount is equal to the predicted cost incurred for that Category, or Incurred, minus the amount paid to date, or Paid To Date amount, for that Category. Thus, if the total medical cost, or medical Incurred, predicted by the program is $1,200, and $300 has been paid out to the claimant to date, then the resulting Reserve amount (medical reserve) will be $900.

In applying the models to obtain claim predictions in step 112, the program reviews all claim records which the insurance carrier instructs, via conversion of its data files and downloading to the designated PC, the program to review. The program reviews each of those claims to determine if an initial or a revised cost and/or duration prediction is required.

In a decision step 305, the system reviews the Significant Characteristics of each claim and compares the current Significant Characteristics of the claim to the corresponding Significant Characteristic values from the previous claim review to determine if any Significant Characteristics have changed. With respect to old claims (claims previously reviewed), if any of the Significant Characteristics are different from their previous values, then the claim is earmarked or flagged for a revised cost and duration prediction. For example, if the previous value of the variable LITIGATED (in practice, LITIGATED is always a significant characteristic) was 0 ("no"), and the current value of LITIGATED is 1 ("yes"), then the system will obtain a revised cost and duration prediction for that claim since that claim is now being litigated. Similarly, if BODY PART (injured body part) has changed from its previous value, then a new cost prediction and duration will be computed based upon this changed value, assuming BODY PART is a Significant Characteristic. Respecting newly entered claims, the Significant Characteristics are deemed to be "changed" (i.e., the previous values were all zero) and thus these are also flagged for a cost and duration prediction. If no Significant Characteristics have changed from the previous claim review of an old claim, then new cost and duration predictions are not obtained since the identical predicted cost and duration values would result.

If it was determined in step 305 that one or more Significant Characteristics have changed for a claim, then the system branches to a decision step 311 to determine whether the claims involves a death. Where an injured worker has died as a result of a work-related injury, then the appropriate standard INJURY TYPE classification (see previous discussion regarding classification system) will be either 1 or 8 (INJURY TYPE=1 or 8). In this case, appropriate benefits paid to the claimant's heirs are determined strictly by statute. The terms and parameters of the statute are coded into the program. Thus, where INJURY TYPE=1 or 8, the system does not resort to the model for a reserve prediction, but rather is able to determine, in a process step 313, the actual amount of the statutory death benefits that will be paid to the claimants heirs. In California, for example, statutory workers' compensation death benefits are set forth in §4700 et seq. of the California Labor Code.

If the claim does not involve the death of a worker, then the system branches to a process step 315 and applies the appropriate model to conduct an initial or a revised cost and duration prediction analysis for that claim. Here, appropriate Intercept Modifiers are applied to appropriate Intercept Values in the manner previously described. As a result, claim cost and duration values are obtained which take into account the most current information available for that claim. In this respect, the system continually revises and refines its cost and duration estimates in order to more accurately designate loss reserve amounts. In conducting a new cost and duration prediction analysis, the system uses the most current values of the Significant Characteristic variables.

After the prediction step 315, the predicted Total Cost Incurred amount for each claim is allocated or proportioned, in a process step 317, among the Incurred values for each of the four Cost Categories, namely, medical, indemnity, vocational rehabilitation, and allocated. The amount of money allocated to each of the respective Incurred amounts is determined by analyzing the cost distribution of previous claims. The system analyzes the population of closed claims of the same INJURY TYPE to determine how the total actual costs were distributed among the respective Cost Categories using those claims having positive values in the same categories. Thus, for example, if a claim has only medical and indemnity costs, the Total Cost Incurred amount would be distributed to those two respective categories in proportion to the distribution of total actual costs to those categories for closed claims having only medical and indemnity costs.

Next, in a process step 323, the program reviews the Paid To Date cost values for each claim (both for old claims and for new claims) for each of the four Cost Categories. For each claim, the Paid To Date costs are summed together as a Total Paid to Date amount which is saved in the claim record.

Next, the system proceeds to compute the actual duration of each claim. The actual duration is defined as the number of months between the injury date (DATE OF INJURY) and the current date. In a decision step 329, the system compares whether the actual duration has exceeded the expected or predicted duration. If this has occurred, then, in a process step 331, the system will revise the predicted duration value to be greater than the actual duration by assigning the value of the predicted duration to be the actual duration multiplied by 1.25. This predicted duration value is stored in the claim record.

D. Calculation of Statutory Benefits.

Next, in a process step 335, for claims involving permanent disability (INJURY TYPE=3 or 4), the system determines whether the predicted Indemnity Incurred cost is sufficient to meet minimum statutory indemnity requirements for that claim. In this regard, most states have minimum statutory requirements for indemnity payments to workers' compensation claimants suffering permanent disabilities. For example, § 4658 of the California Labor Code sets forth in detail the payments to be made to a permanently disabled claimant in California, and also sets forth the amount of time or period during which such payments are to be made. The amount of time for which such payments must be made to the claimant are determined based on a Permanent Disability Percentage ("PDP"). The PDP is a standardized quantitative representation of the severity of a claimant's permanent injury. More specifically, the PDP is the relative amount which the claimant is deemed to be permanently disabled wherein 100% represents a total permanent disability and 0.25% represents a minimum permanent disability. The percentage of permanent disability is normally determined by claim examiners based upon a review of medical reports from treating or evaluating physicians who give opinions on what disability the injured claimant has suffered. In determining the Permanent Disability Percentage, factors which are taken into account include the nature of the injury or disfigurement, the occupation of the injured employee, the injured's age at the time of injury, and the degree to which the injury diminishes the employee's ability to perform his or her job or compete in an open labor market. Once a PDP percentage has been established, the minimum indemnity to which the workers' compensation claimant is entitled may be precisely determined by application of the specific terms of the statute (e.g., Cal. Labor Code § 4658).

In order to be able to easily and rapidly determine such minimum indemnity payments, the minimum statutory indemnity scheme for permanent disability claimants set forth in the state workers' compensation statutes are coded into the program. Thus, in the process step 335, the system is able to determine on its own, by application of the PDP percentage given in the claim record, the minimum indemnity amounts to which a claimant is entitled. The system compares the predetermined statutory aggregate minimum indemnity costs for the claim with the predicted Indemnity Incurred amount. If the predicted Indemnity Incurred is less than the statutory indemnity, then the system takes available money out of one or more of the Incurred amounts of the remaining Cost Categories to satisfy the known minimum cost Incurred amount for the Indemnity Category (discussed below in further detail).

The system is also able to provide indemnity predictions for total permanent disability claimants (INJURY TYPE=2). In this case, the amount awarded to the claimant is specified by statute, the provisions of which are represented in the program. In California, for example, the award is the injured worker's temporary disability benefit for life. The award is determined by multiplying the claimant's temporary disability weekly benefit amount by the claimant's weekly life expectancy, where the PDP=100%.

E. Reproportioning.

Figure 10:
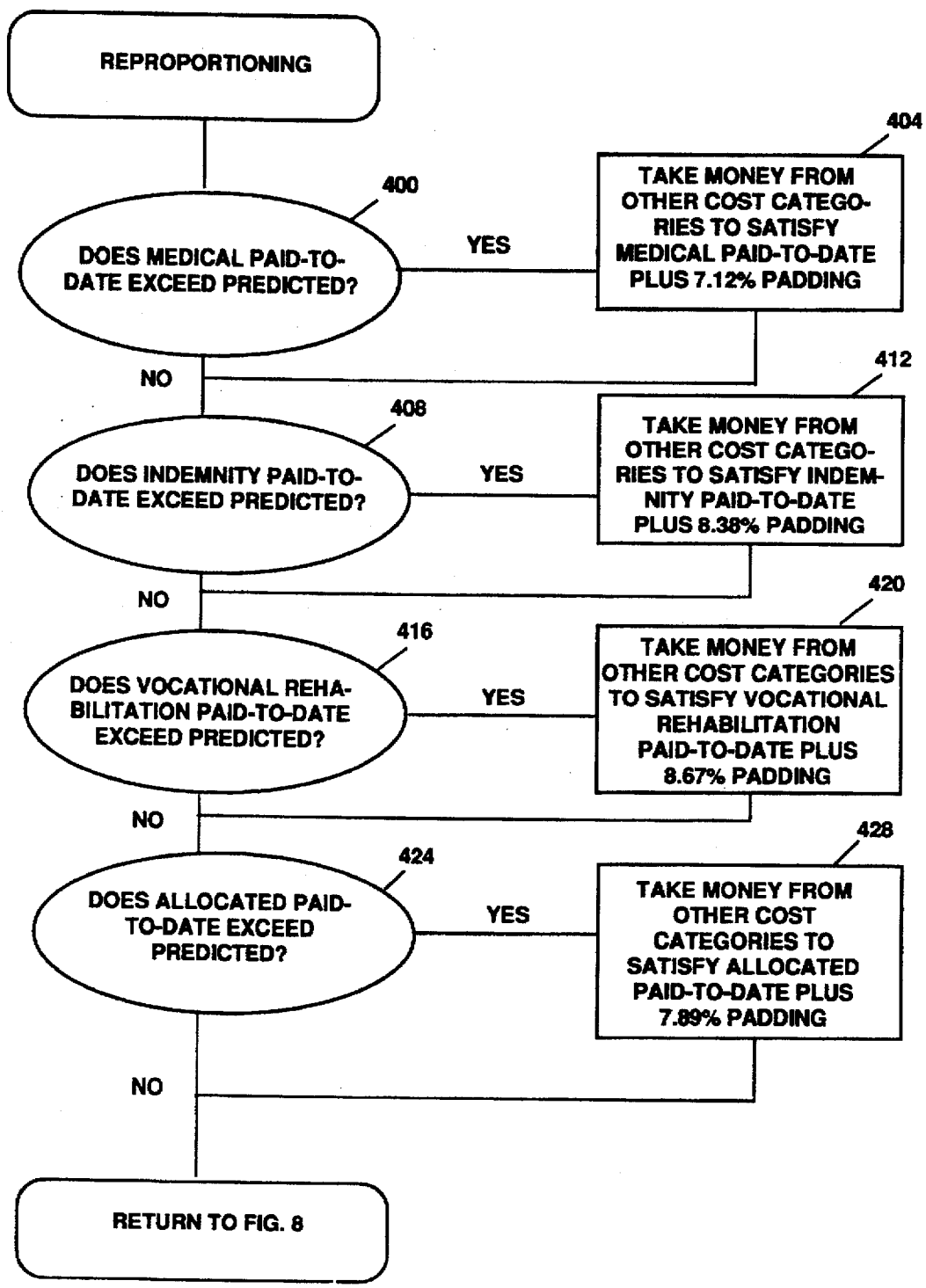
FIG. 10 is a flow chart showing a reproportioning process of the present invention.

Next, if the Paid To Date value for a given Cost Category exceeds the predicted cost Incurred for that Category in a decision step 337, the system administers a reproportioning process between the four respective Cost Categories of the claim in a process step 341 (see also FIG. 10). The purpose of reproportioning is to make adjustments in the predicted or Incurred values of the claim. This is accomplished by readjusting the predicted amounts in the respective cost Incurred categories to better fit the actual known characteristics (Paid To Date amounts) of that claim. In reproportioning, the program subtracts money from predicted Incurred values where the predicted cost Incurred is greater than the Paid To Date amount for that Category and then adds that amount to the predicted cost Incurred amount for the Category or categories of that claim where the Paid To Date amount exceeds the predicted Incurred amount. The system seeks to provide an Incurred amount greater than the Paid To Date amount, thereby padding the predicted cost Incurred for that Category so as to account for or satisfy future paid out amounts in that Category. The reproportioning in the process step 341 serves to customize or mold the Total Cost Incurred prediction for a given claim to the particular categories where expenditures have occurred for that individual claim. Obviously, reproportioning can only occur within a given claim where the Total Incurred is greater than the Total Paid To Date for that claim.

FIG. 10 illustrates in more detail the reproportioning process of step 341. In a decision step 400, if the medical Paid to Date amount for the claim exceeds the system prediction, as proportioned in step 317, money is taken, in a step 404, from the other cost categories having available reserve dollars (i.e., where the predicted amount exceeds the Paid to Date amount for the Category). An amount of money is taken sufficient to satisfy the medical Paid to Date amount plus a padding amount (for the medical category, 7.12% has been determined to be a statistically preferable padding percentage). Money is taken from other cost categories in proportion to the available reserve amounts from those categories. Thus, if $100 is needed to satisfy the medical Paid to Date plus padding, and the available indemnity reserve is $750 and the available allocated reserve is $250, then $75 is taken from the indemnity reserve and $25 is taken from the allocated reserve. In a decision step 408, if the indemnity Paid to Date amount exceeds the system prediction, money is taken, in a step 412, from other cost categories, which have available reserve amounts. Money is taken from other cost categories in proportion to the respective reserve amounts available and in an amount to satisfy the indemnity Paid to Date amount plus a preferable padding of 8.38%. In a decision step 416, if the vocational rehabilitation Paid to Date amount exceeds the system prediction, money is taken, in a step 420, from other cost categories, which have available reserve amounts. Money is taken from other cost categories in proportion to the respective reserve amounts available and in an amount to satisfy the vocational rehabilitation Paid to Date amount plus a preferable padding of 8.67%. Finally, in a decision step 424, if the allocated Paid to Date amount exceeds the system prediction, money is taken, in a step 428, from other cost categories, which have available reserve amounts. Again, money is taken from other categories in proportion to the respective reserve amounts available and in an amount to satisfy the allocated Paid to Date amount plus a preferable padding of 7.89%. It should be noted that in transferring money from one Cost Category to another in reproportioning, no amount will be taken from a Category that would cause the remaining reserve amount to be less than the corresponding padding percentage. If there is insufficient money available in a claim's Cost Categories for reproportioning, then money is obtained via an artificial Fund as described below.

F. Claim Balancing Using a Fund.

For each insurance carrier, the system maintains a continuously updated Fund. The Fund is a means employed in order to effect a balancing between the respective claim records for that carrier. The purpose of the Fund is to be able to adjust the predictions for each claim in order to more accurately reflect the actual amounts being paid out on each individual claim throughout the active life of that claim. The Fund balance also acts as an indicator of model accuracy and also whether claims are being over or under predicted.

In a process step 345, if a given claim has been underpredicted, an amount of money is added to that claim to satisfy the Paid to Date amount for that claim. More specifically, a given claim qualifies for Fund dollar adding if the Paid to Date amount for any Cost Category in the claim exceeds the predicted amount for that Category and there are insufficient reserves available in the other cost categories to satisfy the under-prediction via reproportioning in step 341. The exact amount which is added to the claim is also added to the Fund. The amount of money added to the claim is that amount of money needed to equate the Total Incurred amount to the Paid to Date amount, plus an additional amount for padding to satisfy future additional paid out amounts.

In a similar manner, money is subtracted from overpredicted claims and correspondingly subtracted from the Fund. Money is subtracted from claims whose Paid to Date amounts have not exceeded the predicted Total Incurred and which have reached or exceeded 75% of their predicted monthly duration. The amount of money subtracted from such claims is the percent of available Reserve dollars equal to the percent of predicted months that have expired. Thus, if a claim duration is predicted as 100 months and 80 months have passed since the date of injury, then 80% of the available reserve dollars for that claim are subtracted therefrom which amount is also subtracted from the Fund.

G. Model Refinement.

In a decision step 349, the system determines whether a negative total cost incurred prediction has been determined for any claims. Due to the nature of the prediction methods used in the present system, it is possible that a claim will have a resulting negative amount for its Total Cost prediction. In such a case, the absolute value of the negative predicted amount, plus an extra padding amount equal to the mean actual claim cost for claims having the same INJURY TYPE, is added to the Fund in a process step 353 and is correspondingly added to that claim to give a positive predicted Total Cost Incurred for that claim.

Next, in a process step 357, the system determines, with respect to each claim, whether the predicted cost Incurred amounts for each Cost Category and/or the Total Cost Incurred prediction for that claim require modification by a Reserve Adjustment Factor (RAF), assuming an RAF has been designated by the carrier. To do this, the program sets a boolean indicator (INCURRED_SAME) to "yes" if three conditions are all true. The first condition is that the Total Cost Incurred claim prediction is the same as the previous Total Cost Incurred prediction for that claim the last time the claim was reviewed. The second condition is that no Significant Characteristics for that claim have changed since the last time that claim was reviewed. The third condition is that the Paid To Date costs in each Cost Category do not exceed the predicted cost incurred amounts for those categories. If all three of these conditions are true, then the boolean indicator INCURRED_SAME is set to "no," thus indicating that no significant events have transpired for that claim since its last review. In such a case, the system takes the predicted Total Cost Incurred for that carrier and divides this amount among each appropriate cost Incurred Category for that claim in the same manner as previously described. If, however, one of the three conditions is false, then INCURRED_SAME is set to "yes."

If, in a decision step 361, INCURRED_SAME is set to "yes," then, in a process step 365, the system will calculate a dollar Reserve amount for each of the four Cost Categories for each claim. The Reserve for each Cost Category is obtained by subtracting the Paid To Date amount for that Category from predicted cost Incurred the for that Category.

If, in the decision step 361, INCURRED_SAME is set to "no," then the system branches to a process step 369. In step 369, the system calculates the Reserve for each Cost Category in the same manner as described in step 365. Then, in process step 373, system will apply the appropriate Reserve Adjustment Factor multiplier to the Reserve amount in each Cost Category for the claim to formulate a revised Reserve amount for each category. In a step 377, the revised Reserve amount for each category is added to the corresponding Paid to Date amount to obtain revised Incurred predictions for the Cost Categories in the claim.

H. Calculation of Total Reserves.

Next, in a process step 381, a Total Reserve amount is obtained for the claim by summing the individual revised Reserve amounts of the individual Cost Categories. Additionally, a Total Incurred amount is obtained, in a process step 385, by summing the individual revised Incurred amounts for the respective Cost Categories.

For each claim, the program generates a Claim Summary Screen 451, as shown in FIG. 11 which represents a hypothetical workers' compensation claim. The chart is presented in a format which is preferred for showing to the insurance carrier after the system has generated claim cost and duration predictions. Shown are a Paid To Date column 455, a Reserve column 459, and a Total Incurred column 463. The Paid To Date column indicates the amount of monies paid out on that claim to date for each of the four Cost Categories, i.e., medical 467, indemnity, 471, vocational rehabilitation 475, and allocated 479. The Claim Total Reserve Amount 483 refers to the amount of money which the insurance carrier needs to set aside in order to be able to fund predicted future losses incurred on that particular workers' compensation claim.

IV. Set Loss Reserve Account

In accordance with the present invention, the Total Reserve Amount for each of the carrier's individual active claims are used to determine an Aggregate Reserve Balance. In addition, however, the Reserve Amount calculated for each claim is stored separately and may be acceesed individually. This is because the Reserve Amounts on individual claims or groups of claims, for example all claims from a particular employer, may be used for purposes such as calculating premiums, generating claims reports, and for defending the claim reserve amount to the employer. The Aggregate Reserve Balance represents the overall predicted future costs on the insurance carrier's individual active workers' compensation claims. The insurance carrier will keep an aggregate Loss Reserve Account containing money for the purpose of funding its individual workers' compensation claims losses as they occur. The insurance carrier will continuously update its Loss Reserve Account to correspond to the aggregate of the Individual Claim Reserves. Typically, the insurance carrier will initiate monetary transactions to and from its Aggregate Loss Reserve Account at regular intervals (for example, daily, weekly or monthly) in order to ensure timely payment and satisfaction of its current workers' compensation claims expenses.

Having described the invention in connection with certain specific embodiments thereof, it is to be understood that further modifications may now suggest themselves to those skilled in the art, and it is intended to include such modifications as fall within the scope of the appended claims.

What is claimed is:

1. A method for funding future losses incurred by an insurance carrier on workers' compensation injury claims, comprising the steps of:

obtaining historical workers' compensation claim data;

separating said historical claims data into data subsets wherein each data subset comprises claims of a predefined type and wherein each claim is placed into only one data subset;

generating a statistical model for each of said data subsets wherein each model represents the costs incurred on claims of said predefined type, and wherein the generation of each model further comprises the steps of:

applying statistical analysis techniques to the claims in a subject data subset in order to determine claim characteristics which are significant in affecting the costs incurred on said claims in said subject data subset;

calculating an intercept value which is a base statistical norm for the cost of said claims in said subject data subset; and calculating an intercept modifier for each significant characteristic wherein said intercept modifier is a value which represents a statistical cost difference between all claims in said subject data subset and those claims in said data subset having said significant characteristic; storing said models on a computer at the insurance carrier's facility;

said computer performing the following steps:

determining said significant characteristics for each of said insurance carrier's active workers' compensation claims;

providing said significant characteristics of each of said insurance carrier's active workers' compensation claims as input characteristics to said models to obtain an individual reserve amount for each particular active claim; and placing money in a loss reserve account based on said individual reserve amount for each particular active claim.

2. The method as defined in claim 1, wherein said historical claim data includes closed claims containing complete information and open claims containing only partial information.

3. The method as defined in claim 1, wherein said historical claim data is obtained from multiple insurance carriers within a state.

4. The method as defined in claim 1, wherein said predefined types include:
   claims wherein only medical expenses were incurred;
   claims wherein a temporary disability to an injured claimant resulted; and
   claims wherein a permanent disability to an injured claimant resulted.

5. The method as defined in claim 1, wherein said step of obtaining historical claim data includes the steps of:
   placing historical workers' compensation claim data into a carrier data file; and
   loading said carrier data file onto a system computer which is used to generate said statistical models.

6. The method as defined in claim 5, further including a step of cleansing said data of recognizable data errors.

7. The method as defined in claim 1, wherein said step of separating said historical claims data into data subsets includes a step of separating a portion of said historical claims data into model accuracy assessment data groups corresponding to each of said data subsets, said accuracy assessment data groups being used after generation of said models to test the accuracy of said models.

8. The method as defined in claim 1, wherein each of said intercept values is the average cost of said claims in said subject data subset.

9. The method as defined in claim 1, wherein said step of generating a statistical model for each of said data subsets includes analysis of the claim data in each of said data subsets by a professional statistician.

10. The method as defined in claim 1, wherein said significant characteristics includes combinations of claim characteristics which are determined to be significant in affecting incurred costs on claims in a subject data subset.

11. The method as defined in claim 1, wherein said step of applying statistical analysis techniques to the claims in a subject data subset includes the steps of:
    analyzing characteristics of said claims in said subject data subset using regression analysis techniques; and
    determining the significance levels of said characteristics using analysis of variance techniques.

12. The method as defined in claim 11, further including the steps of:
    defining outlier claims for said subject data subset as those claims wherein the difference between the actual cost incurred and the predicted cost incurred exceeds bounds encapsulating a predefined percentage of the claim data; and
    eliminating such outlier claims from inclusion in model development.

13. The method as defined in claim 1, wherein said step of generating a statistical model for each of said data subsets includes the steps of calculating an intercept value and calculating appropriate intercept modifiers for the duration of claims in each data subset.

14. The method as defined in claim 1, wherein said step of applying said models to the insurance carriers active workers' compensation claims includes the steps of:
    downloading said active claims to said computer at the insurance carrier's facility;
    analyzing said active claims using said models to obtain new or updated claim cost predictions; and
    calculating a total reserve amount for each active claim in each data subset, said total reserve amount being computed for each claim as the total cost prediction for that claim minus a total paid to date amount for that claim.

15. A method for funding future losses incurred by an insurance carrier on insurance claims, comprising the steps of:
    obtaining historical data on insurance claims having known cost values and which are representative of expected future insurance claims to be funded;
    generating one or more statistical models representative of said cost values of said historical insurance claims based upon significant characteristics of said historical insurance claims;
    storing and maintaining said statistical models in a memory device on a computer accessible by an insurance carrier;
    said computer performing the following steps of:
    determining significant characteristics for each particular active insurance claim of said insurance carrier;
    applying said models to said significant characteristics of each particular active insurance claim of said insurance carrier to obtain an individual future cost prediction for each particular active claim; and
    transferring funds to a loss reserve account for each particular active claim based upon said individual future cost prediction for said particular active claim.

16. The method as defined in claim 15, including the steps of:
    maintaining a data file on a computer, said data file comprising data on said active insurance claims of said insurance carrier;
    updating said data file in response to real events occurring with respect to said insurance claims; and
    applying said models to said active claims by reading said data from said data file via a computer.

17. A method for funding future losses incurred by an insurance carrier on insurance claims, comprising the steps of:
    obtaining historical data on insurance claims having known cost values and which are representative of expected future insurance claims to be funded;
    generating one or more statistical models representative of said cost values of said historical insurance claims based upon significant characteristics of said historical insurance claims;
    storing and maintaining said statistical models in a memory device on a computer accessible by an insurance carrier;
    said computer performing the following steps of:
    determining significant characteristics for each particular active claim of said insurance carrier;
    applying said models to said significant characteristics of each particular active insurance claim of said insurance carrier to obtain an individual future cost prediction for each particular active claim;
    calculating an individual reserve amount for each particular active claim based on the individual cost prediction for each particular active claim; and
    placing money in a loss reserve account based on said calculated individual reserve amount for each particular active claim to fund future losses incurred on said particular active claim.

18. A method for funding future costs incurred by an insurance carrier on workers' compensation injury claims, comprising the steps of:

obtaining historical workers' compensation claim data from one or more insurance carriers for claims processed within a defined territory such as a state;

generating a plurality of statistical models wherein each model is generated from and is representative of significant characteristics of a data subset of claims wherein each data subset comprises claims of a predefined type;

installing said statistical models on a computer accessible by the insurance carrier;

downloading data files containing data on the insurance carrier's active workers' compensation claims to said computer;

said computer performing the following steps of:

determining significant characteristics of each of said active claims;

applying said statistical models to said significant characteristics of each of said active claims to formulate an individual cost prediction for each particular active claim; and transferring funds to a loss reserve account based upon said individual cost prediction for each particular active claim.

19. The method as defined in claim 18, wherein said historical claim data is obtained for claims over a period of years, and wherein said step of applying said statistical models includes the steps of:

calculating a cost prediction for an active claim, said cost prediction representing the predicted cost of said claim in currency valued in a first year of said period; and inflating said cost prediction to currency valued in a current year.

20. The method as defined in claim 18, including the steps of:

determining for a model an intercept value, wherein said intercept value is defined as a value which is used as a base cost prediction for active claims to which said model is applied;

determining intercept modifiers for a plurality of claim characteristics which are significant in affecting claim costs, each said modifier being a value which is added to or subtracted from a cost prediction for an active claim having the corresponding characteristic, the significance of a claim characteristic being determined using statistical analysis techniques; and calculating a cost prediction for an active claim by summing an intercept value for said claim to intercept modifiers corresponding to the characteristics of said claim.

21. The method as defined in claim 20, wherein said intercept value for said model is a mean cost of all claims in the corresponding data subset for said model.

22. The method as defined in claim 20, wherein said intercept modifiers are determined independently for each of said models.

23. The method as defined in claim 18, wherein said step of applying said statistical models to said active claims includes maintaining a hypothetical fund to balance cost predictions between claims, wherein money is added to underpredicted claims to satisfy paid to date amounts for those claims and an equivalent amount of money is added to said fund, and wherein money is subtracted from substantially overpredicted claims and an equivalent amount of money is subtracted from said fund.

24. The method as defined in claim 18, wherein said step of applying said statistical models to said active claims includes the steps of:

determining for a claim whether the claim is new, or whether the claim is old and a significant characteristic has changed since the last model review of that claim, wherein a significant characteristic is a claim characteristic which has been determined during said model generation step to be significant in affecting claim cost and duration; and applying a model to said claim if said claim is new or if said claim is old and a significant characteristic has changed to obtain a cost and duration prediction for said claim.

25. The method as defined in claim 18, including the steps of:

calculating a total cost prediction for an active claim; and if said total cost prediction is negative, changing said prediction to the average cost of claims in a corresponding data subset.

26. The method as defined in claim 18, including the steps of:

specifying a reserve adjustment factor for a claim or for a group of claims, wherein said reserve adjustment factor is a value used to adjust computed reserves upward or downward; and adjusting computed reserves using said reserve adjustment factor.

27. The method as defined in claim 18, including the steps of:

applying said models to obtain a total cost incurred prediction for each claim; and proportioning said total cost incurred prediction for each claim among predefined cost categories, wherein said cost categories represent different types of costs commonly incurred on workers' compensation claims.

28. The method as defined in claim 27, wherein said cost categories include the following:

medical expenses; and indemnity expenses.

29. The method as defined in claim 27, including the steps of:

calculating a cost prediction for an indemnity cost category for a claim;

determining a minimum statutory indemnity benefit for said claim; and adjusting said cost prediction to satisfy said minimum benefit if said minimum benefit is greater than said cost prediction.

30. The method as defined in claim 27, including the steps of:

separating paid to date amounts on an active claim into a plurality of said predefined cost categories;

proportioning said total cost prediction for said active claim among said cost categories;

determining for said claim whether any paid to date amount for a cost category exceeds the corresponding proportioned cost prediction for that cost category; and reproportioning money from positive reserves in one or more cost categories to cost categories wherein said paid to date amount exceeds said proportioned cost prediction, wherein a reserve for a cost category is equal to the proportioned cost prediction minus the paid to date amount for that cost category.

31. The method as defined in claim 30, wherein said step of proportioning a total cost prediction for said active claim among said cost categories comprises allocating the total cost prediction among the cost categories in proportion to the known cost distribution of similar historical claims.

32. The method as defined in claim 30, wherein said step of reproportioning money from positive reserves comprises adding sufficient money to a cost category to satisfy said paid to date amount for said cost category plus a padding amount to be applied to future amounts paid out in said cost category.

33. The method as defined in claim 18, including the step of calculating statutory indemnity benefits for death claims.

34. A method that calculates a reserve amount for active claims of an insurance company, comprising:
    inputting into a first computer system historical data from claims over a predetermined period,
    processing and analyzing said historical data in said first computer system to generate a statistical model based upon said historical data, said model based upon significant characteristics of data of a predefined type;
    maintaining and updating current active claim data for said insurance company in a second computer system;
    receiving said statistical model from said first computer system and current data for active claims of said predefined type from said second computer system into a third computer system;
    determining significant characteristics of said current data for said active claims;
    applying said model, in said third computer system, to said significant characteristics of said current active data of each particular active claim to generate an individual predicted dollar cost for each particular active claim;
    transferring said individual predicted dollar cost for each particular active claim to said second computer system from said third computer system; and
    prohibiting access by said insurance company to said first computer system.

35. A method for funding future claim costs incurred by an insurer on injury, illness and disease claims, comprising the steps of:
    obtaining historical claim data for claims originating within a defined territory;
    generating a plurality of statistical models wherein each model is generated from and is representative of significant characteristics of a data subset of claims wherein each data subset comprises claims of a predefined type;
    installing said statistical models on a computer accessible by said insurer;
    downloading data files containing data on the insurer's active claims to said computer;
    said computer performing the following steps of:
    determining significant characteristics of each of said active claims;
    applying said statistical models to said significant characteristics of each of said active claims to formulate an individual cost prediction for each particular active claim; and
    transferring funds to a loss reserve account based upon said individual cost prediction for each particular active claim.

36. The method as defined in claim 35, further including the step of calculating an individual duration prediction for each particular active claim.

37. The method as defined in claim 35, further including the step of establishing a premium for a client of said insurer based upon the total reserve amount for all of said active claims for said client.

38. A method for funding future claim costs incurred by an insurer on injury, illness and disease claims, comprising the steps of:
    obtaining historical claim data for claims originating within a defined territory;
    generating a plurality of statistical models wherein each model is generated from and is representative of significant characteristics of a data subset of claims wherein each data subset comprises claims of a predefined type;
    installing said statistical models on a computer accessible by said insurer;
    downloading data files containing data on the insurer's active claims to said computer;
    said computer performing the following steps of:
    determining significant characteristics of each of said active claims;
    applying said statistical models to said significant characteristics of each of said active claims to formulate an individual cost prediction for each particular active claim; and
    setting premiums for a client of said insurer based upon the total individual cost predictions for all active claims of said client;
    transferring funds to a loss reserve account based upon said individual cost predictions for each particular claim.

39. A method that calculates a reserve amount for active claims of an insurer, comprising:
    processing and analyzing historical claims data from an insurer;
    generating a statistical model based upon said historical claims data in said first computer system, said model based upon significant characteristics of data of a predefined type;
    generating said historical claims data in a second computer system;
    receiving and maintaining current data regarding said active claims in said second computer system;
    receiving said statistical model generated by said first computer system into said second computer system;
    said second computer system performing the following steps:
    determining significant characteristics of said current data of each of said active claims;
    applying said statistical model in said second computer system to said significant characteristics of said current active data to generate an individual predicted dollar cost for each particular active claim; and
    isolating said insurer from said first computer system to prevent said insurer from generating statistical models using said first computer system;
    transferring funds to a loss reserve account based upon said individual predicted dollar cost for each particular claim.

* * * * *

UNITED STATES PATENT AND TRADEMARK OFFICE
CERTIFICATE OF CORRECTION

PATENT NO. : 5,712,984
DATED : January 27, 1998
INVENTOR(S) : Mark S. Hammond, et al.

It is certified that error appears in the above-indentified patent and that said Letters Patent is hereby corrected as shown below:

In column 9 at line 21, change "carriers" to --carrier's.

In column 10 at line 66 and 67, change:

"(TOTAL V.R.>1,
000)."

to:

--(TOTAL V.R.>1,000).--.

In column 13 at line 31, change "once" to --Once--.

In column 20 at line 3, change "acceesed" to --accessed--.

Signed and Sealed this

Tenth Day of April, 2001

Attest:

NICHOLAS P. GODICI

Attesting Officer       Acting Director of the United States Patent and Trademark Office